US011874614B2

(12) United States Patent
Fukuoka et al.

(10) Patent No.: US 11,874,614 B2
(45) Date of Patent: Jan. 16, 2024

(54) IMAGE FORMING APPARATUS HAVING TONER CARTRIDGE

(71) Applicant: BROTHER KOGYO KABUSHIKI KAISHA, Nagoya (JP)

(72) Inventors: Shintaro Fukuoka, Nagoya (JP); Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/836,132

(22) Filed: Jun. 9, 2022

(65) Prior Publication Data

US 2022/0299908 A1 Sep. 22, 2022

Related U.S. Application Data

(63) Continuation of application No. 17/166,776, filed on Feb. 3, 2021, now Pat. No. 11,385,569.

(30) Foreign Application Priority Data

Feb. 4, 2020 (JP) ................................ 2020-017377

(51) Int. Cl.
*G03G 15/08* (2006.01)
*G03G 21/16* (2006.01)

(52) U.S. Cl.
CPC ..... *G03G 15/0886* (2013.01); *G03G 15/0867* (2013.01); *G03G 21/1619* (2013.01);
(Continued)

(58) Field of Classification Search
CPC ........... G03G 15/0886; G03G 15/0867; G03G 15/0636; G03G 21/1619; G03G 21/1633; G03G 2215/0636; G03G 2221/1678
See application file for complete search history.

(56) References Cited

U.S. PATENT DOCUMENTS 6,134,410 A 10/2000 Nakajima
2007/0031164 A1* 2/2007 Ota ....................... G03G 21/10
399/120

(Continued)

FOREIGN PATENT DOCUMENTS

JP 2011-75887 A 4/2011
JP 2012-32610 A 2/2012

(Continued)

OTHER PUBLICATIONS

Office Action issued in corresponding JP Patent Application No. 2020-017377, dated Nov. 14, 2023.

*Primary Examiner* — Victor Verbitsky
(74) *Attorney, Agent, or Firm* — Merchant & Gould P.C.

(57) ABSTRACT

An image forming apparatus includes a first process unit, a second process unit, a first toner cartridge, and a second toner cartridge. The first toner cartridge includes a cartridge housing and a first shutter movable between a first closed position and a first open position. The cartridge housing includes one end portion and the other end portion. The cartridge housing is rotatable between a first position at which the first shutter is positioned at the first closed position and a second position at which the first shutter is positioned at the first open position. When the cartridge housing moves from the second position to the first position, the one end portion of the cartridge housing comes close to the second toner cartridge and the other end portion of the cartridge housing goes away from the second toner cartridge.

18 Claims, 13 Drawing Sheets

(52) U.S. Cl.
CPC . *G03G 21/1633* (2013.01); *G03G 2215/0636* (2013.01); *G03G 2221/1678* (2013.01)

(56) References Cited

U.S. PATENT DOCUMENTS

| | | | |
|---|---|---|---|
| 2011/0020039 | A1 | 1/2011 | Mitsuishi et al. |
| 2011/0076056 | A1 | 3/2011 | Sato |
| 2012/0027459 | A1 | 2/2012 | Sato |
| 2012/0107020 | A1 | 5/2012 | Nakasone |
| 2018/0095406 | A1 | 4/2018 | Sato et al. |

FOREIGN PATENT DOCUMENTS

| | | | |
|---|---|---|---|
| JP | 2012-98501 | A | 5/2012 |
| JP | 2018-55067 | A | 4/2018 |

* cited by examiner

IMAGE FORMING APPARATUS HAVING TONER CARTRIDGE

CROSS REFERENCE TO RELATED APPLICATION

The present application is a continuation of U.S. patent application Ser. No. 17/166,776, filed Feb. 3, 2021, now U.S. Pat. No. 11,385,569, which claims priority from Japanese Patent Application No. 2020-017377, which was filed on Feb. 4, 2020, the disclosure of which is herein incorporated by reference in its entirety.

BACKGROUND

The following disclosure relates to an image forming apparatus.

An image forming apparatus includes a process unit and a toner cartridge in related art. The toner cartridge is mountable on the process unit. The toner cartridge includes a cartridge housing and a shutter. The cartridge housing accommodates toner. The cartridge housing has an opening. The cartridge housing has a cylindrical shape. The shutter has a cylindrical shape. The shutter accommodates the cartridge housing such that the cartridge housing is rotatable. The shutter is rotatable between an open position and a closed position. The opening opens in a state in which the shutter is positioned at the open position. The shutter closes the opening in a state in which the shutter is positioned at the closed position. The shutter has a handle. A user rotates the shutter between the open position and the closed position by holding the handle in a state in which the toner cartridge is mounted on the process unit.

SUMMARY

In the related-art toner cartridge, there is a possibility that the handle is wrongly operated in a state in which the toner cartridge is not mounted on the process unit. If the handle is wrongly operated, the opening may open and the toner may leak from the cartridge housing in a state in which the toner cartridge is not mounted on the process unit.

To solve this problem, it is considered that opening/closing of the shutter is interlocked with a mounting operation of the toner cartridge on the process unit. For example, the toner cartridge is moved with respect to the process unit in the state in which the toner cartridge is mounted on the process unit to thereby open/close the shutter. However, it is necessary to secure a space for movement of the toner cartridge in the state in which the toner cartridge is mounted on the process unit, which increases a size of the image forming apparatus.

Accordingly, an object of the present disclosure is to provide an image forming apparatus capable of reducing a size in a second direction while opening/closing the shutter by rotating the cartridge housing in the state in which the toner cartridge is mounted on the process unit.

In an aspect of the present disclosure, an image forming apparatus includes a first process unit having a first photoconductive drum rotatable about a first axis extending in a first direction, a second process unit having a second photoconductive drum rotatable about a second axis extending in the first direction, the second process unit being aligned with the first process unit in a second direction intersecting the first direction, a first toner cartridge mountable on the first process unit and including (i) a cartridge housing accommodating toner and having a first opening, and (ii) a first shutter movable with respect to the cartridge housing between a first closed position at which the first opening is closed and a first open position at which the first opening is opened, and a second toner cartridge mountable on the second process unit. The cartridge housing includes one end portion and the other end portion spaced apart from the one end portion in a third direction intersecting the first direction and the second direction in a state in which the first toner cartridge is mounted on the first process unit. In a state in which the first toner cartridge is mounted on the first process unit, the cartridge housing is rotatable between a first position at which the first shutter is positioned at the first closed position and a second position at which the first shutter is positioned at the first open position. When the cartridge housing moves from the second position to the first position, the one end portion of the cartridge housing comes close to the second toner cartridge and the other end portion of the cartridge housing goes away from the second toner cartridge.

In another aspect of the present disclosure, an image forming apparatus includes a first frame, a first photoconductive drum rotatable about a first axis extending in a first direction and supported by the first frame, a second frame, a second photoconductive drum rotatable about a second axis extending in the first direction and supported by the second frame, a first toner cartridge mountable on the first frame, and a second toner cartridge mountable on the second frame. The second frame is aligned with the first frame in a second direction intersecting the first direction. The first toner cartridge includes a cartridge housing accommodating toner and having a first opening and a first shutter movable with respect to the cartridge housing between a first closed position at which the first opening is closed and a first open position at which the first opening is opened. The cartridge housing includes one end portion and the other end portion spaced apart from the one end portion in a third direction intersecting the first direction and the second direction in a state in which the first toner cartridge is mounted on the first frame. The cartridge housing is rotatable between a first position at which the first shutter is positioned at the first closed position and a second position at which the first shutter is positioned at the first open position in a state in which the first toner cartridge is mounted on the first frame. When the cartridge housing moves from the second position to the first position, the one end portion of the cartridge housing comes close to the second toner cartridge and the other end portion of the cartridge housing goes away from the second toner cartridge.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

1. Image Forming Apparatus 1

Hereinafter, an outline of an image forming apparatus 1 will be described with reference to FIG. 1 and FIG. 2.

Figure 1:
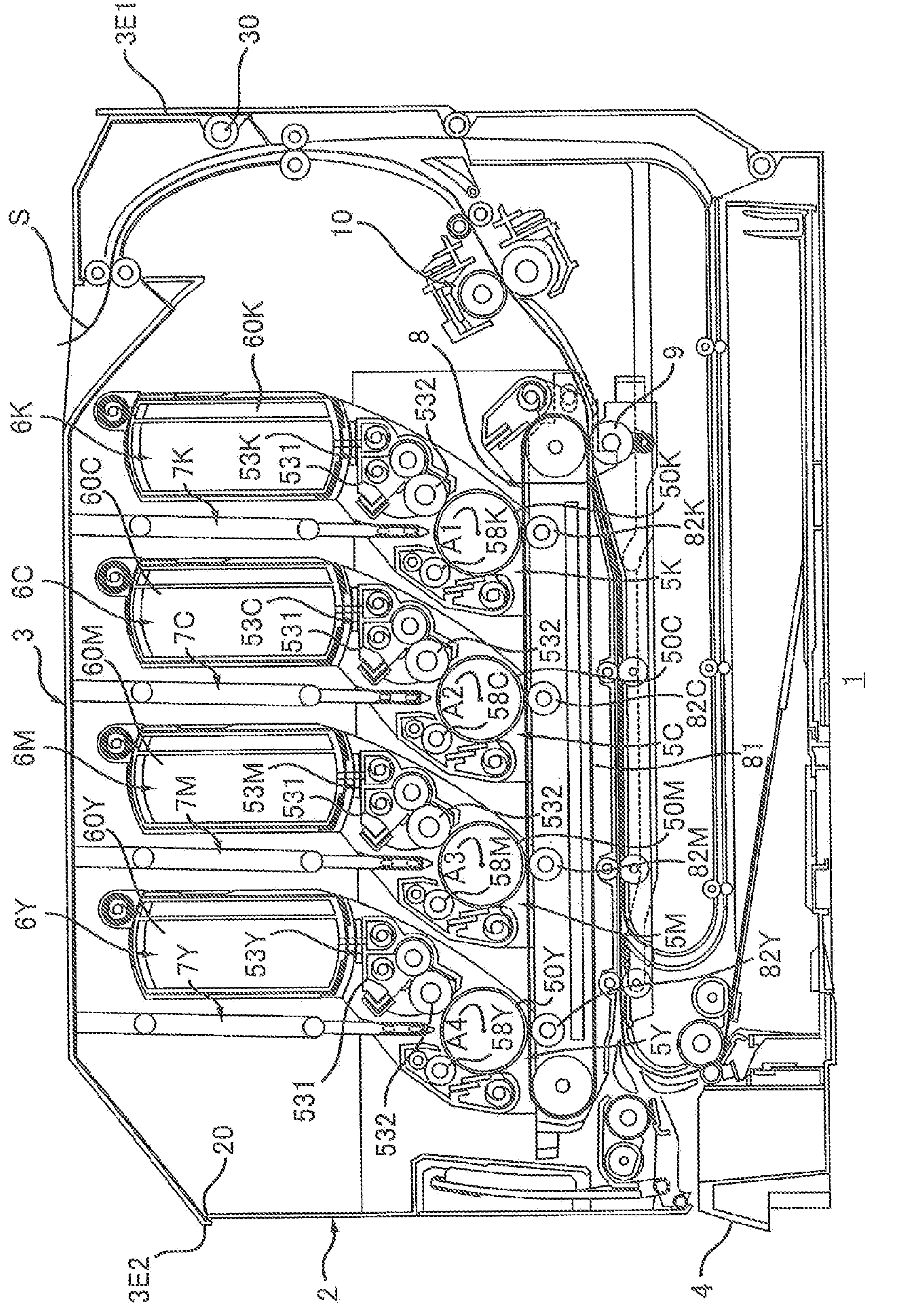
FIG. 1 is a schematic structural view of an image forming apparatus.

As illustrated in FIG. 1, the image forming apparatus 1 includes a body housing 2, a top cover 3, a sheet cassette 4, four process units 5K, 5C, 5M, and 5Y, four toner cartridges 6K, 6C, 6M, and 6Y, four exposing heads 7K, 7C, 7M, and 7Y, a belt unit 8, a transfer roller 9, and a fixing device 10.

1.1 Body Housing 2

The body housing 2 accommodates the sheet cassette 4, the four process units 5K, 5C, 5M, and 5Y, the four toner cartridges 6K, 6C, 6M, and 6Y, the four exposing heads 7K, 7C, 7M, and 7Y, the belt unit 8, the transfer roller 9, and the fixing device 10.

Figure 2:
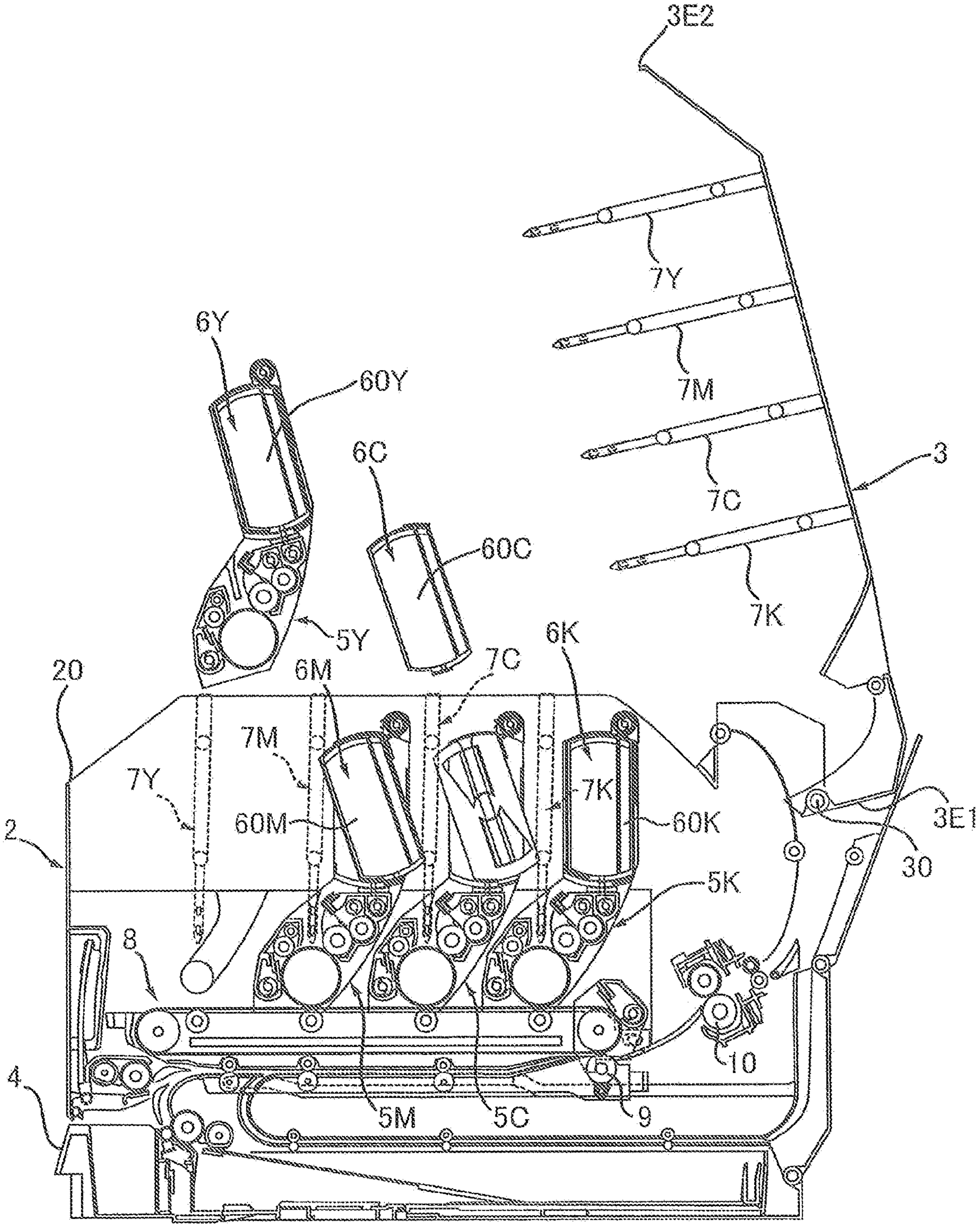
FIG. 2 is an explanatory view for explaining movement of a top cover illustrated in FIG. 1, illustrating a state where the top cover is positioned at an open position.

As illustrated in FIG. 2, the body housing 2 has a body opening 20. The body opening 20 is positioned at an upper end of the body housing 2.

1.2 Top Cover 3

The top cover 3 is movable between an open position and a closed position (see FIG. 1). The body opening 20 opens in a state in which the top cover 3 is positioned at the open position. The top cover 3 closes the body opening 20 in a state in which the top cover 3 is positioned at the closed position (see FIG. 1). The top cover 3 is rotatable about a cover shaft 30 between the open position and the closed position (see FIG. 1).

The cover shaft 30 extends in a first direction. The top cover 3 extends in a direction intersecting the first direction. The top cover 3 has a first end 3E1 and a second end 3E2. The first end 3E1 of the top cover 3 is connected to the body housing 2. The first end 3E1 has the cover shaft 30. The second end 3E2 is spaced apart from the first end 3E1 in the direction intersecting the first direction.

1.3 Sheet Cassette 4

The sheet cassette 4 accommodates a sheet S. The sheet S located inside the sheet cassette 4 is conveyed toward the transfer roller 9.

1.4 Process Unit 5K

The process unit 5K is mountable on the body housing 2 through the body opening 20 in the state in which the top cover 3 is positioned at the open position (see FIG. 2). The process unit 5K includes a photoconductive drum 50K, a charging device 58K, and a developing device 53K.

1.4.1 Photoconductive Drum 50K

The photoconductive drum 50K extends in the first direction. The photoconductive drum 50K has a cylindrical shape. The photoconductive drum 50K is rotatable about a first axis A1. The first axis A1 extends in the first direction.

1.4.2 Charging Device 58K

The charging device 58K charges a circumferential surface of the photoconductive drum 50K. In the embodiment, the charging device 58K is a charging roller. The charging device 58K may be a scorotron type charger.

1.4.3 Developing Device 53K

The developing device 53K can supply toner to the photoconductive drum 50K. Specifically, the developing device 53K includes a developing housing 531 and a developing roller 532.

1.4.3.1 Developing Housing 531

The developing housing 531 accommodates toner supplied from the toner cartridge 6K. The developing housing 531 has a housing opening 535 (see FIG. 3). The toner supplied from the toner cartridge 6K enters the developing housing 531 through the housing opening 535.

1.4.3.2 Developing Roller 532

The developing roller 532 can supply the toner located inside the developing housing 531 to the photoconductive drum 50K. The developing roller 532 contacts the photoconductive drum 50K. The developing roller 532 may be disposed so as to be spaced apart from the photoconductive drum 50K.

1.5 Process Units 5C, 5M, 5Y

The process units 5C, 5M, and 5Y are respectively explained in the same manner as the process unit 5K. Respective process units 5C, 5M, and 5Y are aligned in a second direction with respect to the process unit 5K. The second direction intersects the first direction. In detail, the second direction is orthogonal to the first direction in this embodiment. Note that the second direction may be approximately orthogonal to the first direction, for example, the second direction may intersect the first direction at an angle from 80 degrees to 100 degrees. More preferably, the second direction may intersect the first direction at an angle of 90 degrees.

In the process units 5C, 5M, and 5Y, the process unit 5C is aligned adjacent to the process unit 5K in the second direction. The process unit 5C includes a photoconductive drum 50C, a charging device 58C, and a developing device 53C. The photoconductive drum 50C is rotatable about a second axis A2. The second axis A2 extends in the first direction. The charging device 58C charges a circumferential surface of the photoconductive drum 50C. The developing device 53C can supply toner to the photoconductive drum 50C.

The process unit 5M is positioned on an opposite side of the process unit 5K with respect to the process unit 5C in the second direction. The process unit 5M includes a photoconductive drum 50M, a charging device 58M, and a developing device 53M. The photoconductive drum 50M is rotatable about a third axis A3. The third axis A3 extends in the first direction. The charging device 58M charges a circumferential surface of the photoconductive drum 50M. The developing device 53M can supply toner to the photoconductive drum 50M.

The process unit 5Y is positioned on an opposite side of the process unit 5C with respect to the process unit 5M in the second direction. The process unit 5Y includes a photoconductive drum 50Y, a charging device 58Y, and a developing device 53Y. The photoconductive drum 50Y is rotatable about a fourth axis A4. The fourth axis A4 extends in the first direction. The charging device 58Y charges a circumferential surface of the photoconductive drum 50Y. The developing device 53Y can supply toner to the photoconductive drum 50Y.

1.6 Toner Cartridges 6K, 6C, 6M, 6Y

The toner cartridge 6K is mountable on the process unit 5K. The toner cartridge 6K includes a cartridge housing 60K. The cartridge housing 60K accommodates toner. The toner cartridge 6K can supply the toner to the developing device 53K in a state in which the toner cartridge 6K is mounted on the process unit 5K.

The toner cartridge 6C is mountable on the process unit 5C. The toner cartridge 6C includes a cartridge housing 60C. The cartridge housing 60C accommodates toner. The toner cartridge 6C can supply the toner to the developing device 53C in a state in which the toner cartridge 6C is mounted on the process unit 5C.

The toner cartridge 6M is mountable on the process unit 5M. The toner cartridge 6M includes a cartridge housing 60M. The cartridge housing 60M accommodates toner. The toner cartridge 6M can supply the toner to the developing device 53M in a state in which the toner cartridge 6M is mounted on the process unit 5M.

The toner cartridge 6Y is mountable on the process unit 5Y. The toner cartridge 6Y includes a cartridge housing 60Y. The cartridge housing 60Y accommodates toner. The toner cartridge 6Y can supply the toner to the developing device 53Y in a state in which the toner cartridge 6Y is mounted on the process unit 5Y.

1.7 Exposing Heads 7K, 7C, 7M, 7Y

The exposing heads 7K, 7C, 7M, and 7Y are supported by the top cover 3. The respective exposing heads 7K, 7C, 7M, and 7Y are LED units.

The exposing head 7K exposes the circumferential surface of the photoconductive drum 50K in the state in which the top cover 3 is positioned at the closed position. The exposing head 7K is positioned in a space between the toner cartridge 6K and the toner cartridge 6C in the state in which the top cover 3 is positioned at the closed position.

The exposing head 7C exposes the circumferential surface of the photoconductive drum 50C in the state in which the top cover 3 is positioned at the closed position. The exposing head 7C is positioned in a space between the toner cartridge 6C and the toner cartridge 6M in the state in which the top cover 3 is positioned at the closed position.

The exposing head 7M exposes the circumferential surface of the photoconductive drum 50M in the state in which the top cover 3 is positioned at the closed position. The exposing head 7M is positioned in a space between the toner cartridge 6M and the toner cartridge 6Y in the state in which the top cover 3 is positioned at the closed position.

The exposing head 7Y exposes the circumferential surface of the photoconductive drum 50Y in the state in which the top cover 3 is positioned at the closed position. The exposing head 7Y is positioned on an opposite side of the exposing head 7M with respect to the toner cartridge 6Y in the state in which the top cover 3 is positioned at the closed position.

1.8 Belt Unit 8

The belt unit 8 is positioned below the process units 5K, 5C, 5M, and 5Y in a state in which the process units 5K, 5C, 5M, and 5Y are mounted on the body housing 2. The belt unit 8 includes an intermediate transfer belt 81 and transfer rollers 82K, 82C, 82M, and 82Y The intermediate transfer belt 81 contacts the photoconductive drums 50K, 50C, 50M, and 50Y in the state in which the process units 5K, 5C, 5M, and 5Y are mounted on the body housing 2.

The transfer roller 82K transfers the toner on the photoconductive drum 50K to the intermediate transfer belt 81. The transfer roller 82C transfers the toner on the photoconductive drum 50C to the intermediate transfer belt 81. The transfer roller 82M transfers the toner on the photoconductive drum 50M to the intermediate transfer belt 81. The transfer roller 82Y transfers the toner on the photoconductive drum 50Y to the intermediate transfer belt 81.

1.9 Transfer Roller 9

The transfer roller 9 transfers the toner on the intermediate transfer belt 81 to the sheet S. Specifically, the sheet S conveyed from the sheet cassette 4 toward the transfer roller 9 is conveyed to the fixing device 10 while passing between the transfer roller 9 and the intermediate transfer belt 81. At this time, the transfer roller 9 transfers the toner on the intermediate transfer belt 81 to the sheet S.

1.10 Fixing Device 10

The fixing device 10 heats and pressurizes the sheet S to which the toner is transferred to thereby fix the toner on the sheet S. The sheet S passing through the fixing device 10 is discharged to an upper surface of the body housing 2.

2. Details of Process Unit 5K

Next, the details of the process unit 5K will be explained with reference to FIG. 3 to FIG. 6. The process units 5C, 5M, and 5Y are explained in the same manner as the process unit 5K. Accordingly, the explanation for the process units 5C, 5M, and 5Y is omitted.

Figure 3:
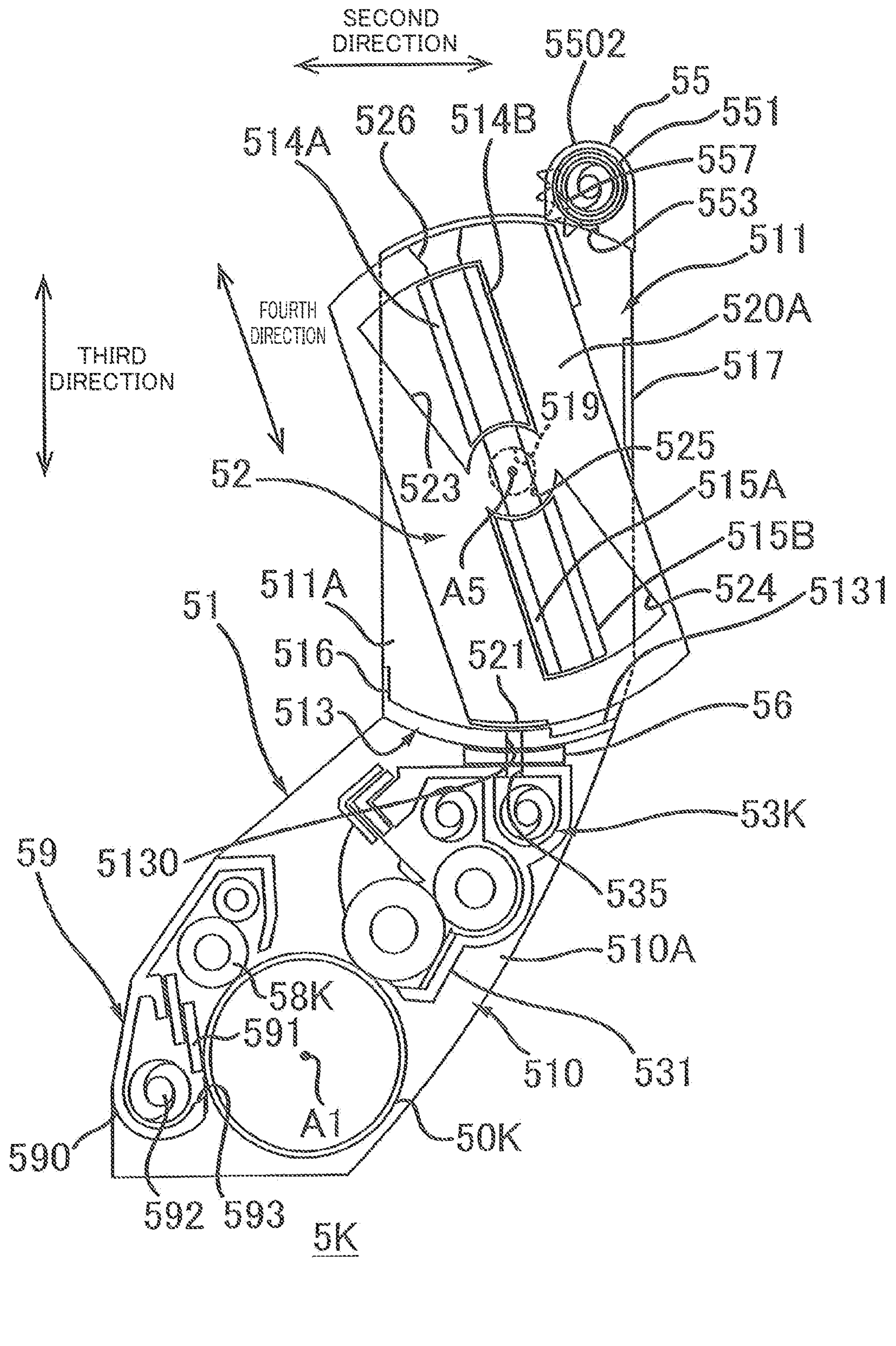
FIG. 3 is a schematic structural view of a process unit illustrated in FIG. 1, illustrating a state where a second frame is positioned at a frame first position.

As illustrated in FIG. 3, the process unit 5K further includes a drum cleaning unit 59, a first frame 51, a second frame 52, a waste toner conveying unit 55, a seal member 56, and two springs 57A, 57B (see FIG. 5) in addition to the photoconductive drum 50K, the charging device 58K, and the developing device 53K.

2.1 Drum Cleaning Unit 59

The drum cleaning unit 59 includes a cleaning housing 590, a cleaning blade 591, and a screw 592.

2.1.1 Cleaning Housing 590

The cleaning housing 590 accommodates waste toner removed from the circumferential surface of the photoconductive drum 50K by the cleaning blade 591. The cleaning housing 590 has an opening 593. The opening 593 receives the waste toner. The cleaning housing 590 extends in the first direction.

2.1.2 Cleaning Blade 591

The cleaning blade 591 removes waste toner from the circumferential surface of the photoconductive drum 50K. An edge of the cleaning blade 591 contacts the circumferential surface of the photoconductive drum 50K. The edge of the cleaning blade 591 scrapes the waste toner adhering to the circumferential surface of the photoconductive drum 50K when the photoconductive drum 50K rotates. The waste toner is accommodated inside the cleaning housing 590 through the opening 593.

2.1.3 Screw 592

Figure 5:
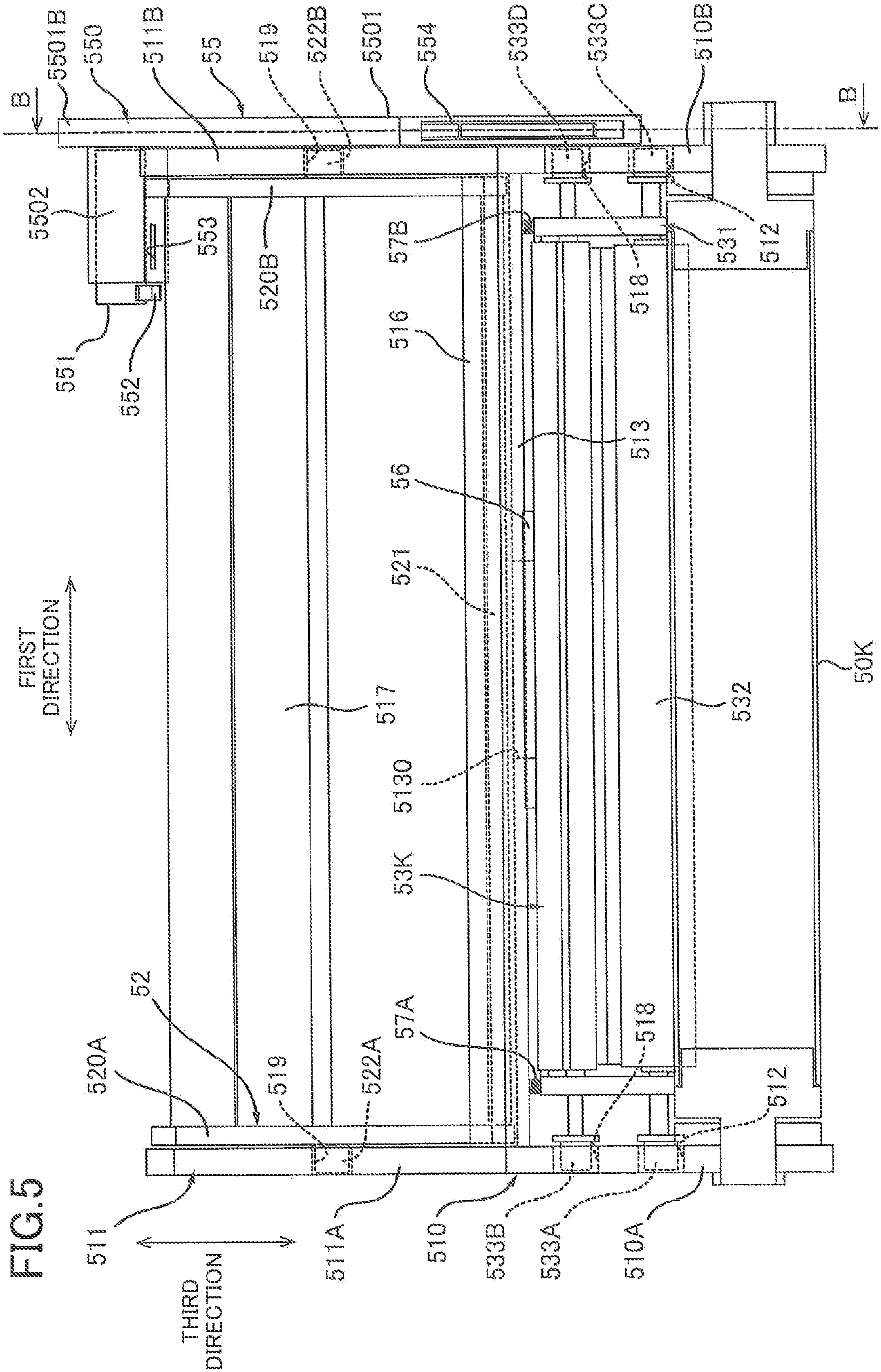
FIG. 5 is a cross sectional view taken along A-A of FIG. 4.

The screw 592 conveys the waste toner located inside the cleaning housing 590 toward a conveying tube 550 (see FIG. 5). The screw 592 is positioned inside the cleaning housing 590. The screw 592 extends in the first direction.

2.2 First Frame 51

The first frame 51 extends in a third direction. The third direction intersects the first direction and the second direction. More specifically, the third direction is orthogonal to the first direction and the second direction. Note that the third direction may be approximately orthogonal to the first direction and the second direction, for example, the third direction may intersect the first direction and the second direction at an angle from 80 degrees to 100 degrees. More preferably, the third direction may intersect the first direction and the second direction at an angle of 90 degrees. The first frame 51 includes a first support portion 510 and a second support portion 511.

2.2.1 First Support Portion 510

The first support portion 510 supports the photoconductive drum 50K, the charging device 58K, the developing device 53K, and the drum cleaning unit 59. As illustrated in FIG. 5, the first support portion 510 includes two first side plates 510A, 510B.

2.2.1.1 First Side Plate 510A

The first side plate 510A is positioned at one end portion of the first frame 51 in the first direction. The first side plate 510A extends in the third direction. The first side plate 510A supports one end portion of the photoconductive drum 50K in the first direction. The first side plate 510A supports one end portion of the drum cleaning unit 59 in the first direction. The first side plate 510A supports one end portion of the developing device 53K in the first direction. The first side plate 510A has a first hole 512 and a second hole 518.

Figure 6:
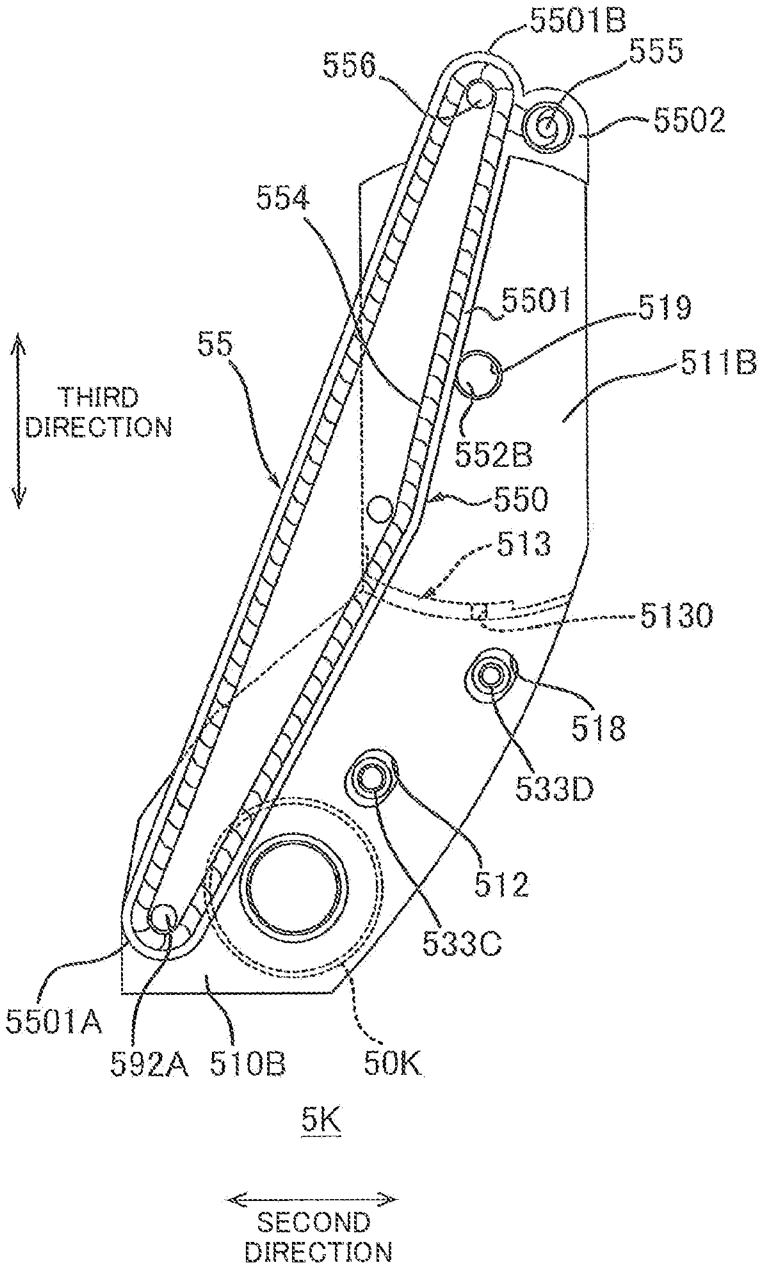
FIG. 6 is a cross sectional view taken along B-B of FIG. 5.

The first hole 512 is a long hole (see FIG. 6). A first developing protrusion 533A of the developing device 53K is fitted into the first hole 512. The first developing protrusion 533A is positioned at one end portion of the developing housing 531 in the first direction. The first developing protrusion 533A extends in the first direction. The first developing protrusion 533A has a cylindrical shape. The first developing protrusion 533A may be a shaft of the developing roller 532.

The second hole 518 is positioned on an opposite side of the photoconductive drum 50K with respect to the first hole 512. The second hole 518 is a long hole (see FIG. 6). A direction in which the second hole 518 extends is in parallel to a direction in which the first hole 512 extends (see FIG. 6). A second developing protrusion 533B of the developing device 53K is fitted into the second hole 518. The second developing protrusion 533B is positioned at one end portion of the developing housing 531 in the first direction. The second developing protrusion 533B extends in the first direction. The second developing protrusion 533B has a cylindrical shape. The first side plate 510A supports one end portion of the developing device 53K in the first direction by fitting the first developing protrusion 533A into the first hole 512 and by fitting the second developing protrusion 533B into the second hole 518.

2.2.1.2 First Side Plate 510B

The first side plate 510B is positioned at the other end portion of the first frame 51 in the first direction. The first side plate 510B is spaced apart from the first side plate 510A in the first direction. The first side plate 510B supports the other end portion of the photoconductive drum 50K in the first direction. The first side plate 510B supports the other end portion of the drum cleaning unit 59 in the first direction. The first side plate 510B supports the other end portion of the developing device 53K in the first direction. The first side plate 510B is explained in the same manner as the first side plate 510A.

A third developing protrusion 533C of the developing device 53K is fitted into the first hole 512 of the first side plate 510B. The third developing protrusion 533C is explained in the same manner as the first developing protrusion 533A. A fourth developing protrusion 533D of the developing device 53K is fitted into the second hole 518 of the first side plate 510B. The fourth developing protrusion 533D is explained in the same manner as the second developing protrusion 533B. The first side plate 510B supports the other end portion of the developing device 53K in the first direction by fitting the third developing protrusion 533C into the first hole 512 and by fitting the fourth developing protrusion 533D into the second hole 518.

The developing device 53K is movable with respect to the first support portion 510 in the direction in which the first hole 512 extends in the state in which one end portion of the developing device 53K in the first direction is supported by the first side plate 510A and the other end portion of the developing device 53K in the first direction is supported by the first side plate 510B.

Figure 11B:
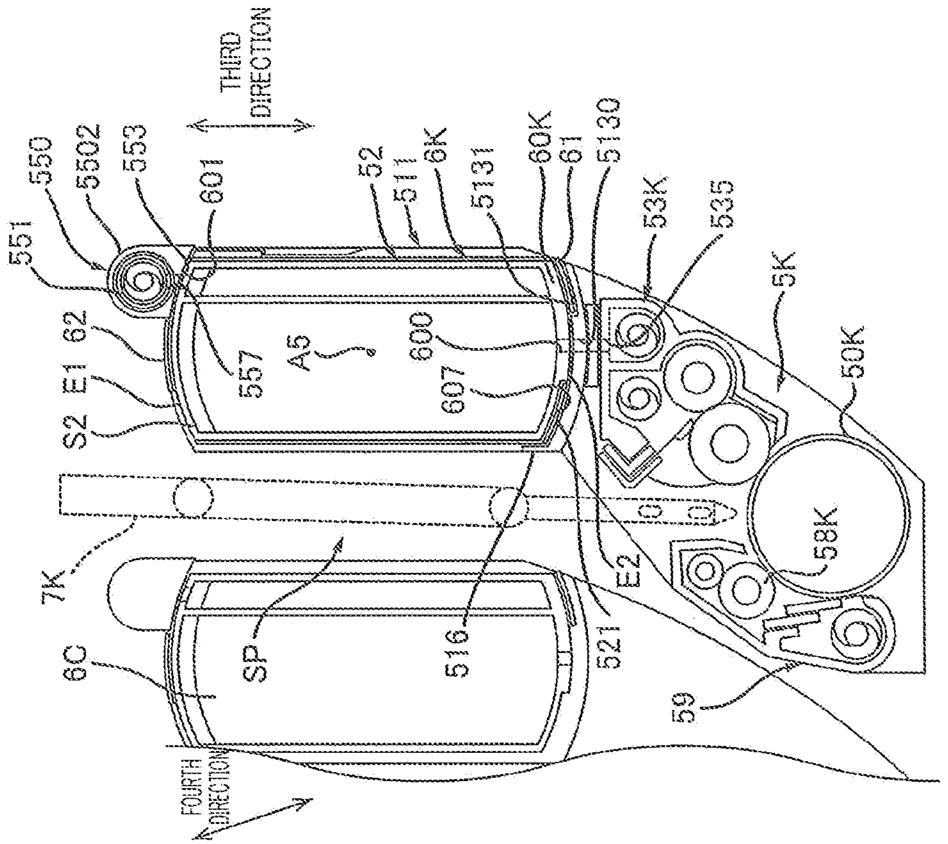
FIG. 11B is a cross sectional view taken along C-C of FIG. 8, which is an explanatory view for explaining the state where the cartridge housing is positioned at the second position.

The developing device 53K is movable with respect to the cartridge housing 60K and the photoconductive drum 50K in a state in which the toner cartridge 6K is mounted on the process unit 5K and the cartridge housing 60K is positioned at a second position (see FIG. 11B). The second position of the cartridge housing 60K will be explained later.

2.2.2 Second Support Portion 511

Figure 4:
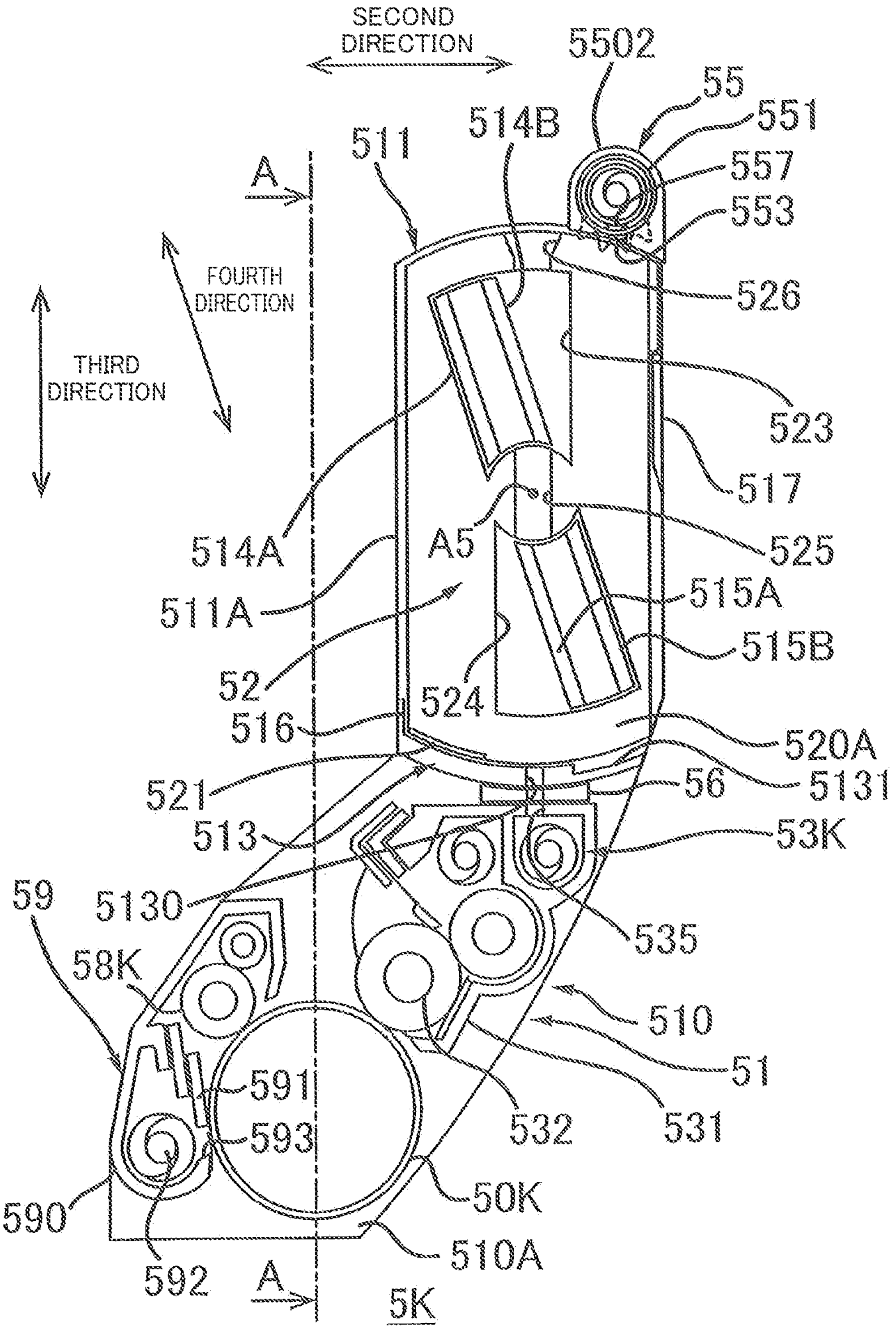
FIG. 4 is a schematic structural view of the process unit illustrated in FIG. 1, illustrating a state where the second frame is positioned at a frame second position.

As illustrated in FIG. 3 and FIG. 4, the second support portion 511 is aligned with the first support portion 510 in the third direction. The second support portion 511 is positioned above the first support portion 510 in the state in which the process unit 5K is mounted on the body housing 2. The second support portion 511 includes two second side plates 511A, 511B (see FIG. 5), a receiving portion 513, a first stopper 516, and a second stopper 517. In other words, the first frame 51 includes the first stopper 516.

2.2.2.1 Second Side Plate 511A

As illustrated in FIG. 5, the second side plate 511A is positioned at one end portion of the second support portion 511 in the first direction. The second side plate 511A extends in the third direction. The second side plate 511A is connected to the first side plate 510A. The second side plate 511A has a hole 519.

The hole 519 is positioned at a central part of the second side plate 511A. The hole 519 has a circular shape (see FIG. 6). A protrusion 522A of the second frame 52 is fitted into the hole 519. The protrusion 522A will be explained later.

As illustrated in FIG. 3 and FIG. 4, the second side plate 511A includes two first ribs 514A, 514B, and two second ribs 515A, 515B.

The two first ribs 514A, 514B guide a guided portion 69 of the toner cartridge 6K when the toner cartridge 6K is mounted on the process unit 5K. A first protrusion 65A of the toner cartridge 6K is fitted between the first rib 514A and the first rib 514B in the state in which the toner cartridge 6K is mounted on the process unit 5K (see FIG. 10A). The guided portion 69 and the first protrusion 65A will be explained later.

The first rib 514A protrudes in the first direction from the second side plate 511A. The first rib 514A extends in a fourth direction. The fourth direction intersects the third direction. The fourth direction is orthogonal to the first direction and intersects the second direction. The first rib 514B is spaced apart from the first rib 514A in a direction orthogonal to the first direction and the fourth direction. The first rib 514B is explained in the same manner as the first rib 514A. Therefore, the explanation for the first rib 514B is omitted.

The two second ribs 515A, 515B are positioned on an opposite side of the two first ribs 514A, 514B in the fourth direction with respect to the hole 519. A second protrusion 66A of the toner cartridge 6K is fitted between the second rib 515A and the second rib 515B in the state in which the toner cartridge 6K is mounted on the process unit 5K (see FIG. 10A). The second protrusion 66A will be explained later. The second rib 515A protrudes in the first direction from the second side plate 511A. The second rib 515A extends in the fourth direction. The second rib 515B is spaced apart from the second rib 515A in a direction orthogonal to the first direction and the fourth direction. The second rib 515B is explained in the same manner as the second rib 515A. Therefore, the explanation for the second rib 515B is omitted.

2.2.2.2 Second Side Plate 511B

As illustrated in FIG. 5, the second side plate 511B is positioned at the other end portion of the second support portion 511 in the first direction. The second side plate 511B is spaced apart from the second side plate 511A in the first direction. The second side plate 511B extends in the third direction. The second side plate 511B is connected to the first side plate 510B. The second side plate 511B is explained in the same manner as the second side plate 511A. Therefore, the explanation for the second side plate 511B is omitted.

2.2.2.3 Receiving Portion 513

The receiving portion 513 receives the cartridge housing 60K of the toner cartridge 6K (see FIG. 10B) in the state in which the toner partridge 6K is mounted on the process unit 5K.

As illustrated in FIG. 3 and FIG. 4, the receiving unit 513 is positioned on the opposite side of the photoconductive drum 50K with respect to the developing device 53K. The receiving portion 513 is positioned between the developing device 53K and the second frame 52 in the third direction. The receiving portion 513 has an arc shape. The receiving portion 513 extends in the first direction. The receiving portion 513 has one end portion and the other end portion in the first direction. The one end portion of the receiving portion 513 in the first direction is connected to the second side plate 511A. The other end portion of the receiving portion 513 in the first direction is connected to the second side plate 511B (see FIG. 5).

The receiving portion 513 has a toner receiving port 5130 and a first recess 5131.

The toner receiving port 5130 is positioned at a central part of the receiving portion 513 in the first direction (see FIG. 5). The toner receiving port 5130 communicates with the housing opening 535 of the developing housing 531. The toner receiving port 5130 can receive the toner discharged from a first opening 600 of the toner cartridge 6K in a state in which the toner cartridge 6K is mounted on the process unit 5K and the cartridge housing 60K is positioned at a second position (see FIG. 11B). The first opening 600 will be explained later.

The first recess 5131 is positioned on an upper surface of the receiving portion 513 in the state in which the process unit 5K is mounted on the body housing 2. The first recess 5131 is spaced apart from the toner receiving port 5130 in the second direction. The first recess 5131 receives a first shutter 61 (see FIG. 11B) in the state in which the toner cartridge 6K is mounted on the process unit 5K. The first shutter 61 will be explained later.

2.2.2.4 First Stopper 516

The first stopper 516 stops the cartridge housing 60K at the second position when the cartridge housing 60K rotates from the first position to the second position (see FIG. 11B). The first stopper 516 is positioned on an opposite side of the first recess 5131 with respect to the toner receiving port 5130 in the second direction. The first stopper 516 protrudes from the receiving portion 513 in the third direction. The first stopper 516 extends in the first direction.

2.2.2.5 Second Stopper 517

Figure 11A:
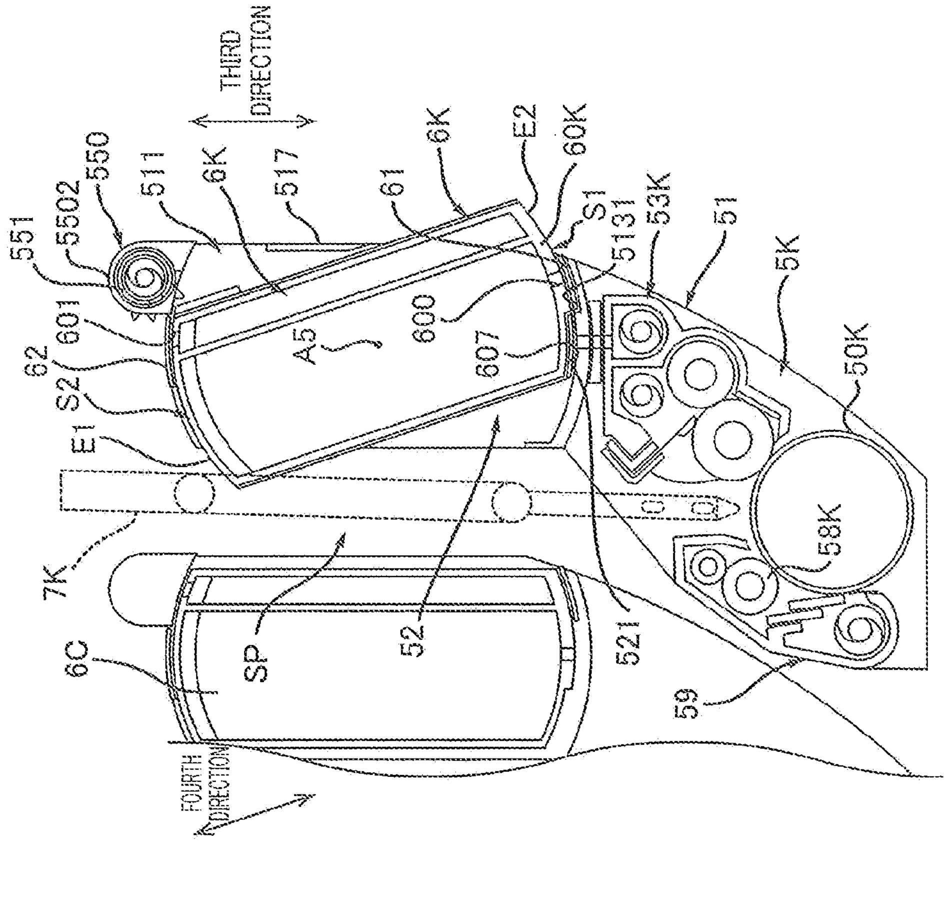
FIG. 11A is a cross sectional view taken along C-C of FIG. 8, which is an explanatory view for explaining the state where the cartridge housing is positioned at the first position.

The second stopper 517 stops the cartridge housing 60K at the first position when the cartridge housing 60K rotates from the second position to the first position (see FIG. 11A). The second stopper 517 is spaced apart from the first stopper 516 in second direction. The second stopper 517 is spaced apart from the receiving portion 513 in the third direction. The second stopper 517 is supported by the second side plate 511A and the second side plate 511B. The second stopper 517 extends in the first direction.

2.2.3 Second Frame 52

As illustrated in FIG. 5, the second frame 52 is supported by the second support portion 511. The second frame 52 is positioned between the second side plate 511A and the second side plate 511B in the first direction.

As illustrated in FIG. 3 and FIG. 4, the second frame 52 is movable with respect to the second support portion 511. In other words, the second frame 52 is movable with respect to the first frame 51. The second frame 52 is rotatable about an axis A5 between a frame first position (see FIG. 3) and a frame second position (see FIG. 4). The axis A5 extends in the first direction. The toner cartridge 6K is mountable on the second frame 52 in a state in which the second frame 52 is positioned at the frame first position. It is difficult that the toner cartridge 6K is mounted on the second frame 52 in a state in which the second frame 52 is positioned at the frame second position.

As illustrated in FIG. 5, the second frame 52 includes two side plates 520A, 520B, two protrusions 522A, 522B, and a frame shutter 521.

2.2.3.1 Side Plate 520A

The side plate 520A is positioned at one end portion of the second frame 52 in the first direction.

As illustrated in FIG. 3 and FIG. 4, the side plate 520A extends in the fourth direction in the state in which the second frame 52 is positioned in the frame first position (see FIG. 3). The side plate 520A extends in the third direction in the state in which the second frame 52 is positioned at the frame second position (see FIG. 4).

The side plate 520A includes a first through slot 523, a second through slot 524, a first guide 525, and a second guide 526. In other words, the process unit 5K includes the first guide 525.

The two first ribs 514A, 514B are fitted into the first through slot 523. The first through slot 523 allows movement of the second frame 52 between the frame first position and the frame second position in a state in which the two first ribs 514A, 514B are fitted into the first through slot 523. The first through slot 523 has a sector shape.

The second through slot 524 is positioned on an opposite side of the first through slot 523 with respect to the axis A5. The two second ribs 515A, 515B are fitted into the second through slot 524. The second through slot 524 allows movement of the second frame 52 between the frame first position and the frame second position in a state in which the two second ribs 515A, 515B are fitted into the second through slot 524. The second through slot 524 has a sector shape.

The first guide 525 guides the mounting of the toner cartridge 6K. The first guide 525 guides the guided portion 69 of the toner cartridge 6K when the toner cartridge 6K is mounted on the process unit 5K.

The first guide 525 is positioned between the first though slot 523 and the second through slot 524. The first guide 525 is a recessed groove. The first guide 525 extends in the fourth direction in the state in which the second frame 52 is positioned at the frame first position (see FIG. 3). The first guide 525 extends in the third direction in the state in which the second frame 52 is positioned at the frame second position (see FIG. 4).

The second guide 526 guides the guided portion 69 when the toner cartridge 6K is mounted on the process unit 5K. The second guide 526 is positioned on an opposite side of the first guide 525 with respect to the first through slot 523. The second guide 526 is a recessed groove. The second guide 526 extends in the fourth direction in the state in which the second frame 52 is positioned at the frame first position (see FIG. 3). The second guide 526 extends in the third direction in the state in which the second frame 52 is positioned at the frame second position (see FIG. 4).

In the state in which the second frame 52 is positioned at the frame first position, the second guide 526, the two first ribs 514A, 514B, the first guide 525, the two second ribs 515A, 515B are aligned in the fourth direction (see FIG. 3). In the state in which the second frame 52 is positioned at the frame second position, the first guide 525 is deviated with respect to the two first ribs 514A, 514B and the two second ribs 515A, 515B (see FIG. 4). In the state in which the second frame 52 is positioned at the frame second position, the second guide 526 is deviated with respect to the two first ribs 514A, 514B (see FIG. 4).

2.2.3.2 Side Plate 520B

As illustrated in FIG. 5, the side plate 520B is positioned at the other end portion of the second frame 52 in the first direction. The side plate 520B is explained in the same manner as the side plate 520A. Therefore, the explanation for the side plate 520B is omitted.

2.2.3.3 Frame Shutter 521

The frame shutter 521 is supported by the two side plates 520A, 520B. The frame shutter 521 extends in the first direction.

As illustrated in FIG. 3 and FIG. 4, the frame shutter 521 has an arc shape extending along the receiving portion 513. When the second frame 52 moves between the frame first position and the frame second position, the frame shutter 521 moves along the receiving portion 513. The frame shutter 521 closes the toner receiving port 5130 in the state in which the second frame 52 is positioned at the frame first position (see FIG. 3). The toner receiving port 5130 opens in the state in which the second frame 52 is positioned at the frame second position (see FIG. 4). The frame shutter 521 is positioned between the first stopper 516 and the toner receiving port 5130 in the second direction in the state in which the second frame 52 is positioned at the frame second position.

2.2.3.4 Protrusion 522A

As illustrated in FIG. 5, the protrusion 522A is positioned on an opposite side of the side plate 520B with respect to the side plate 520A in the first direction. The protrusion 522A extends in the first direction. The protrusion 522A protrudes from the side plate 520A. The protrusion 522A has a cylindrical shape. The protrusion 522A is fitted into the hole 519 of the second side plate 511A.

2.2.3.5 Protrusion 522B

The protrusion 522B is positioned on an opposite side of the side plate 520A with respect to the side plate 520B in the first direction. The protrusion 522B extends in the first direction. The protrusion 522B protrudes from the side plate 520B. The protrusion 522B has a cylindrical shape. The protrusion 522B is fitted into the hole 519 of the second side plate 511B. According to the structure, the second frame 52 is rotatable about the axis A5 with respect to the second support portion 511.

2.2.4 Waste Toner Conveying Unit 55

The waste toner conveying unit 55 conveys the waste toner from the photoconductive drum 50K to the toner cartridge 6K. The waste toner conveying unit 55 includes the conveying tube 550, a third shutter 551, a first gear 552, a belt conveyor 554, and a screw 555 (see FIG. 6).

2.2.4.1 Conveying Tube 550

The conveying tube 550 conveys the waste toner which is removed from the photoconductive drum 50K by the drum cleaning unit 59 to a second opening 601 of the toner cartridge 6K (see FIG. 11B). The second opening 601 will be explained later. The conveying tube 550 includes a first portion 5501 and a second portion 5502.

The first portion 5501 is positioned on an opposite side of the first side plate 510A and the second side plate 511A with respect to the first side plate 510B and the second side plate 511B in the first direction. The first portion 5501 is supported by the first side plate 510B and the second side plate 511B.

As illustrated in FIG. 6, the first portion 5501 includes one end portion 5501A and the other end portion 5501B. The one end portion 5501A is positioned on an opposite side of the drum cleaning unit 59 with respect to the first side plate 510B. An internal space of the one end portion 5501A communicates with an internal space of the cleaning housing 590 through a hole formed in the first side plate 510B. An end portion 592A of the screw 592 in the first direction is positioned inside the one end portion 5501A.

The other end portion 5501B is spaced apart from the one end portion 5501A in the second direction. The other end portion 5501B is spaced apart from the one end portion 5501A in the third direction. The other end portion 5501B is positioned on an opposite side of the first side plate 510B with respect to the second side plate 511B in the third direction. A belt shaft 556 is provided inside the other end potion 5501B. The belt shaft 556 extends in the first direction.

The second portion 5502 is aligned with the other end portion 5501B in the second direction. An internal space of the second portion 5502 communicates with an internal space of the other end portion 5501B. The second portion 5502 is positioned on an opposite side of the first side plate 510B with respect to the second side plate 511B in the third direction. The second portion 5502 is supported by the second side plate 511B.

As illustrated in FIG. 5, the second portion 5502 extends in the first direction. The second portion 5502 has a cylindrical shape. The second portion 5502 has a third opening 553. In other words, the conveying tube 550 has the third opening 553. The third opening 553 extends in the first direction. The third opening 553 communicates with the second opening 601 in the state in which the toner cartridge 6K is mounted on the process unit 5K and the cartridge housing 60K is positioned at the second position (see FIG. 11B).

2.2.4.2 Third Shutter 551

The third shutter 551 is positioned inside the second portion 5502. The third shutter 551 has a cylindrical shape. The third shutter 551 extends in the first direction. The third shutter 551 has one end portion and the other end portion in the first direction. The one end portion of the third shutter 551 in the first direction protrudes from the second portion 5502.

As illustrated in FIG. 3 and FIG. 4, the third shutter 551 is movable with respect to the third opening 553 between a third closed position and a third open position. The third shutter 551 closes the third opening 553 in a state in which the third shutter 551 is positioned at the third closed position (see FIG. 3). The third opening 553 opens in a state in which the third shutter 551 is positioned at the third open position (see FIG. 4). The third shutter 551 has a shutter opening 557.

At least part of the shutter opening 557 communicates with the third opening 553 in the state in which the third shutter 551 is positioned in the third open position (see FIG. 4). The shutter opening 557 is spaced apart from the third opening 553 in the state in which the third shutter 551 is positioned at the third closed position.

2.2.4.3 First Gear 552

As illustrated in FIG. 5, the first gear 552 moves the third shutter 551. The first gear 552 is engaged with a second gear 605 provided in the cartridge housing 60K in the state in which the toner cartridge 60K is mounted on the process unit 5K. The second gear 605 will be explained later. The first gear 552 is positioned on a circumferential surface of one end portion of the third shutter 551 in the first direction. The first gear 552 is positioned on an opposite side of the first portion 5501 with respect to the second portion 5502 in the first direction.

2.2.4.4 Belt Conveyor 554

As illustrated in FIG. 6, the belt conveyor 554 is positioned inside the first portion 5501. The belt conveyor 554 conveys the waste toner which enters the first potion 5501 from the drum cleaning unit 59 toward the second portion 5502. The belt conveyor 554 is supported by the end portion 592A of the screw 592 and the belt shaft 556. The belt conveyor 554 is an endless belt. The belt conveyor 554 is wound around the end portion 592A of the screw 592 and the belt shaft 556. The belt conveyor 554 is movable around the end portion 592A of the screw 592 and the belt shaft 556. The belt conveyor 554 has a plurality of protrusions. The protrusions extend in the first direction. The plurality of protrusions are positioned at predetermined intervals on a circumferential surface of the belt conveyor 554.

2.2.4.5 Screw 555

The screw 555 is positioned inside the second portion 5502. The screw 555 extends in the first direction. The screw 555 conveys the waste toner which enters the second portion 5502 from the first portion 5501 toward the third opening 553.

2.2.5 Seal Member 56

As illustrated in FIG. 4 and FIG. 5, the seal member 56 is positioned between the receiving portion 513 and the developing housing 531. The seal member 56 seals between the receiving portion 513 and the developing housing 531. The seal member 56 surrounds the toner receiving port 5130 and the housing opening 535. The seal member 56 is formed of, for example, sponge.

2.2.6 Springs 57A, 57B

As illustrated in FIG. 5, the two springs 57A, 57B press the developing roller 532 toward the photoconductive drum 50K. The two springs 57A, 57B are positioned between the receiving portion 513 and the developing housing 531. The two springs 57A, 57B are spaced apart from each other in the first direction. The spring 57A is positioned on an opposite side of the spring 57B with respect to the seal member 56. The two springs 57A, 57B are respectively coil springs.

3. Details of Toner Cartridge 6K

Next, the details of the toner cartridge 6K will be explained with reference to FIG. 7 to FIG. 11. The toner cartridges 6C, 6M, and 6Y are explained in the same manner as the toner cartridge 6K. Therefore, the explanation for the toner cartridges 6C, 6M, and 6Y is omitted.

Figure 7:
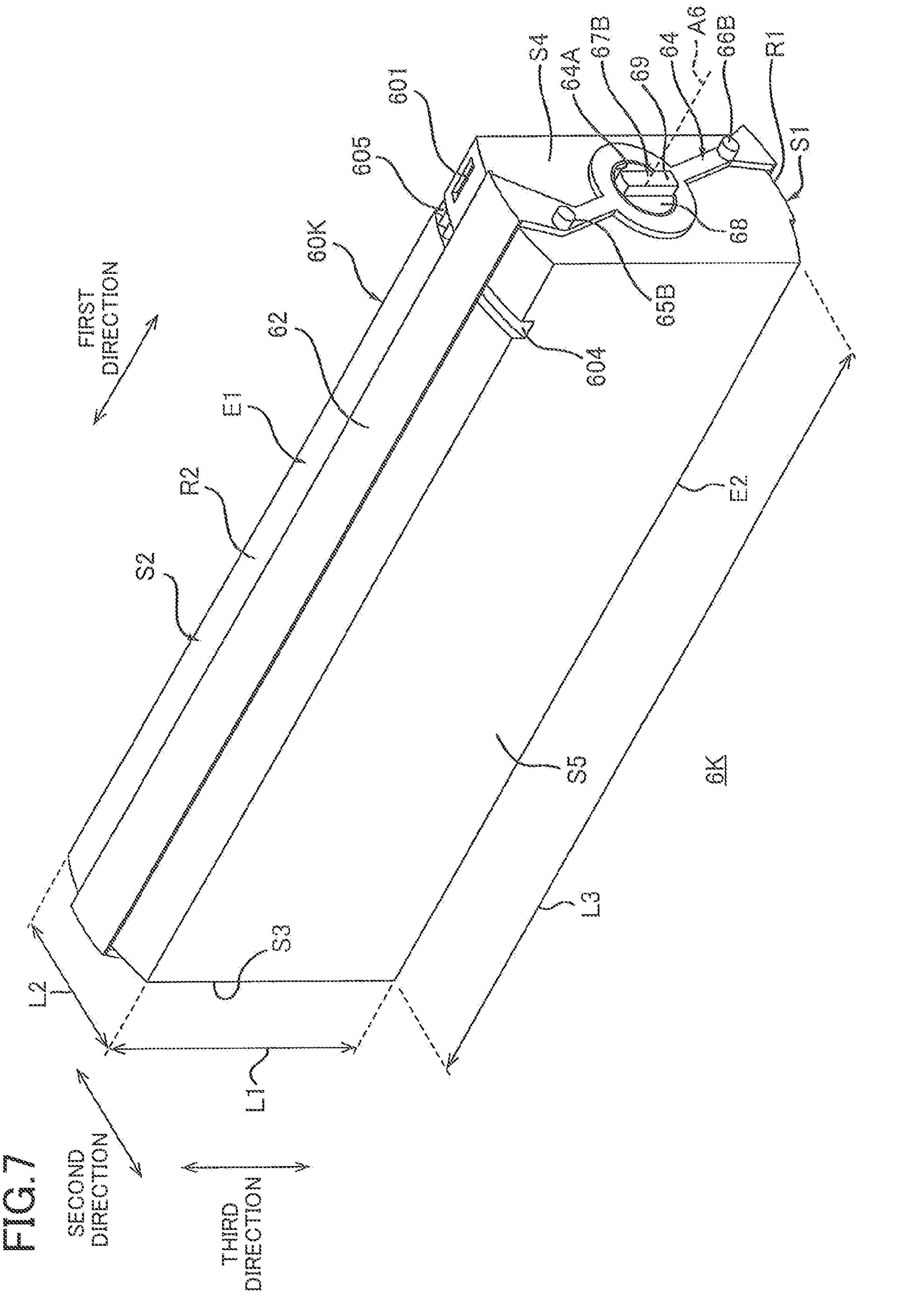
FIG. 7 is a perspective view of a toner cartridge illustrated in FIG. 1.
Figure 8:
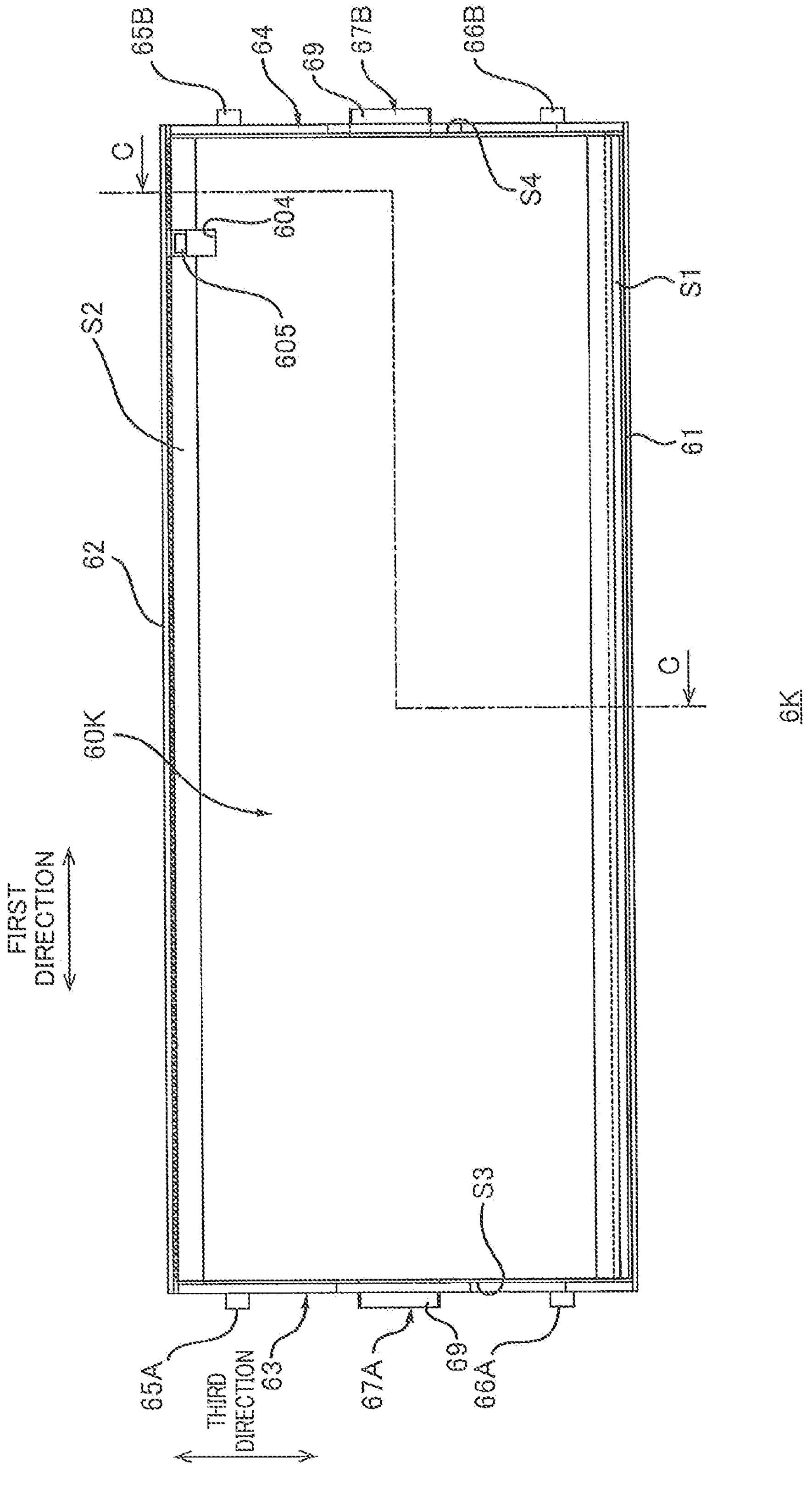
FIG. 8 is a front view of the toner cartridge illustrated in FIG. 7.

As illustrated in FIG. 7 and FIG. 8, the toner cartridge 6K includes the above-described cartridge housing 60K, two engaging portions 67A, 67B, the first shutter 61, a second shutter 62, a first arm 63, a second arm 64, two first protrusions 65A, 65B, and two second protrusions 66A, 66B.

3.1 Cartridge Housing 60K

As illustrated in FIG. 7, the cartridge housing 60K extends in the first direction. The cartridge housing 60K is a hexahedron. Therefore, an accommodation capacity of the cartridge housing 60K can be increased while reducing the size of the cartridge housing 60K in a particular direction as compared with a case where the cartridge housing 60K has a cylindrical shape.

In the state in which the toner cartridge 6K is mounted on the process unit 5K, a dimension L1 of the cartridge housing 60K in the third direction is greater than a dimension L2 of the cartridge housing 60K in the second direction. A dimension L3 of the cartridge housing 60K in the first direction is greater than the dimension L2 of the cartridge housing 60K in the second direction. The dimension L3 of the cartridge housing 60K in the first direction is greater than the dimension L1 of the cartridge housing 60K in the third direction.

Accordingly, the accommodation capacity of the cartridge housing 60K can be increased while reducing the size of the cartridge housing 60K in the second direction.

Figure 9A:
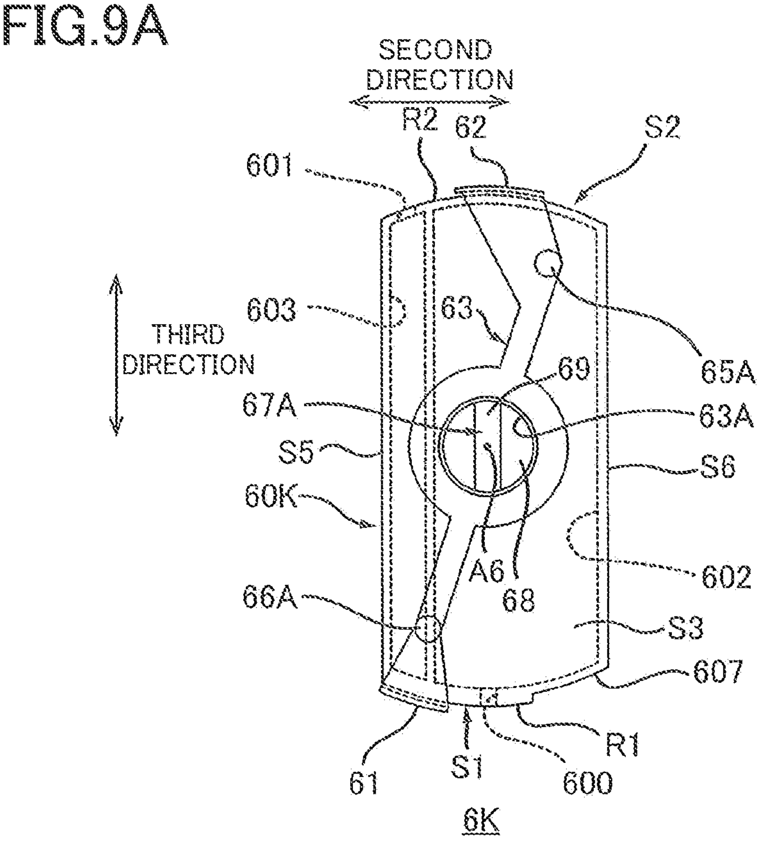
FIG. 9A is a side view of the toner cartridge illustrated in FIG. 8, illustrating a state where a first shutter is positioned at a first open position and a second shutter is positioned at a second open position.

The cartridge housing 60K includes a first surface S1, a second surface S2, a first flat surface S3, a second flat surface S4, a third flat surface S5, and a fourth flat surface S6 (see FIG. 9A).

3.1.1 First Surface S1

As illustrated in FIG. 9A, the first surface S1 is positioned at one end of the cartridge housing 60K in the third direction. The first surface S1 extends in the first direction. The first surface S1 is a lower surface of the cartridge housing 60K in the state in which the toner cartridge 6K is mounted on the process unit 5K. The first surface S1 has a first circumferential surface R1. In the embodiment, the first surface S1 is formed by the first circumferential surface R1. In other words, the lower surface of the cartridge housing 60K is the first circumferential surface R1 in the state in which the toner cartridge 6K is mounted on the process unit 5K. The circumferential surface R1 may be a part of the first surface S1.

3.1.2 Second Surface S2

The second surface S2 is positioned on the other end of the cartridge housing 60K in the third direction. The second surface S2 is spaced apart from the first surface S1 in the third direction. The second surface S2 extends in the first direction. The second surface S2 is an upper surface of the cartridge housing 60K in the state in which the toner cartridge 6K is mounted on the process unit 5K. The second surface S2 has a second circumferential surface R2. In the embodiment, the second surface S2 is formed by the second circumferential surface R2. In other words, the upper surface of the cartridge housing 60K is the second circumferential surface R2 in the state in which the toner cartridge 6K is mounted on the process unit 5K. The second circumferential surface R2 may be a part of the second surface S2. A center of curvature of the first circumferential surface R1 is identical with a center of curvature of the second circumferential surface R2.

3.1.3 First Flat Surface S3, Second Flat Surface S4

As illustrated in FIG. 8, the first flat surface S3 is positioned on one end of the cartridge housing 60K in the first direction. The first flat surface S3 extends in the third direction. The second flat surface S4 is positioned on the other end of the cartridge housing 60K in the first direction. The second flat surface S4 extends in the third direction. The first flat surface S3 and the second flat surface S4 are spaced apart from each other in the first direction.

3.1.4 Third Flat Surface S5, Fourth Flat Surface S6

As illustrated in FIG. 9A, the third flat surface S5 is positioned at one end of the cartridge housing 60K in the second direction. The third flat surface S5 extends in the first direction. The fourth flat surface S6 is positioned at the other end of the cartridge housing 60K in the second direction. The fourth flat surface S6 extends in the first direction. The third flat surface S5 and the fourth flat surface S6 are spaced apart from each other in the second direction.

3.1.5 Toner Container 602, Waste Toner Container 603

The cartridge housing 60K includes a toner container 602 and a waste toner container 603. The toner container 602 and the waste toner container 603 are aligned in the second direction in the state in which the toner cartridge 6K is mounted on the process unit 5K. The toner container 602 accommodates the toner. The waste toner container 603 accommodates the waste toner.

3.1.6 First Opening 600

The cartridge housing 60K includes the first opening 600, the second opening 601, a second recess 607, and a groove 604 (see FIG. 7).

The toner is discharged from the first opening 600. The first opening 600 communicates with the toner container 602. The first opening 600 is positioned on the first surface 51. The first opening 600 is positioned on the first circumferential surface R1. In other words, the first circumferential surface R1 has the first opening 600. The first opening 600 is positioned at a central part of the first surface S1 in the first direction. The first opening 600 is positioned on the lower surface of the cartridge housing 60K in the state in which the toner cartridge 6K is mounted on the process unit 5K. According to the structure, the first opening 600 can discharge the toner smoothly by gravity.

3.1.7 Second Opening 601

The second opening 601 can receive the waste toner. The second opening 601 communicates with the waste toner container 603. The second opening 601 is positioned on the second surface S2. The second opening 601 is positioned on the second circumferential surface R2. In other words, the second circumferential surface R2 has the second opening 601. The second opening 601 is positioned on the upper surface of the cartridge housing 60K in the state in which the toner cartridge 6K is mounted on the process unit 5K. According to the structure, the second opening 601 can receive the waste toner smoothly by gravity.

3.1.8 Second Recess 607

The second recess 607 is positioned on the first surface 51. The second recess 607 is positioned on the first circumferential surface R1. The second recess 607 is spaced apart from the first opening 600 in the second direction. The second recess 607 receives the frame shutter 521 in the state in which the toner cartridge 6K is mounted on the process unit 5K (see FIG. 11B).

3.1.9 Groove 604

As illustrated in FIG. 7, the groove 604 is positioned on the second surface S2. The groove 604 is positioned on the second circumferential surface R2. The groove 604 is positioned on an opposite side of the second surface S4 with respect to the second opening 601 in the first direction. The groove 604 extends in a circumferential direction of the second circumferential surface R2.

3.1.10 Second Gear 605

The cartridge housing 60K includes the second gear 605. The second gear 605 is positioned in the groove 604. The second gear 605 is engaged with the first gear 552 in the state in which the toner cartridge 6K is mounted on the process unit 5K (see FIG. 10B).

3.2 Engaging Portion 67A

As illustrated in FIG. 8, the engaging portion 67A is positioned at one end portion of the toner cartridge 6K in the first direction. As illustrated in FIG. 9A, the engaging portion 67A is positioned at a central part of the first flat surface S3. In other words, the cartridge housing 60K includes the engaging portion 67A. The engaging portion 67A is engaged with the side plate 520A of the second frame 52 in the state in which the toner cartridge 6K is mounted on the process unit 5K (see FIG. 10B). The engaging portion 67A includes an arm support portion 68 and the guided portion 69. In other words, the toner cartridge 6K includes the guided portion 69.

3.2.1 Arm Support Portion 68

The arm support portion 68 supports the first arm 63 such that the first arm is rotatable. The arm support portion 68 protrudes from the first flat surface S3 in the first direction. The arm support portion 68 has a cylindrical shape. A central axis A6 of the arm support portion 68 extends in the first direction. The central axis A6 goes through to a center of curvature of the first circumferential surface R1. In other words, the center of curvature of the first circumferential surface R1 is positioned on the central axis A6. The central axis A6 goes through a center of curvature of the second circumferential surface R2. In other words, the center of curvature of the second circumferential surface R2 is positioned on the central axis A6.

3.2.2 Guided Portion 69

The guided portion 69 protrudes from the arm support portion 68 in the first direction. The guided portion 69 extends in the third direction. The guided portion 69 is guided by the second guide 526, the two first ribs 514A, 514B and the first guide 525 when the toner cartridge 6K is mounted on the process unit 5K (see FIG. 10A). The guided portion 69 is fitted into the first guide 525 in the state in which the toner cartridge 6K is mounted on the process unit 5K (see FIG. 10B).

3.3 Engaging Portion 67B

As illustrated in FIG. 7, the engaging portion 67B is positioned at the other end portion of the toner cartridge 6K in the first direction. The engaging portion 67B is positioned at a central part of the second flat surface S4. In other words, the cartridge housing 60K includes the engaging portion 67B. The engaging portion 67B is explained in the same manner as the engaging portion 67A. Therefore, the explanation for the engaging portion 67B is omitted.

3.4 First Shutter 61

Figure 9B:
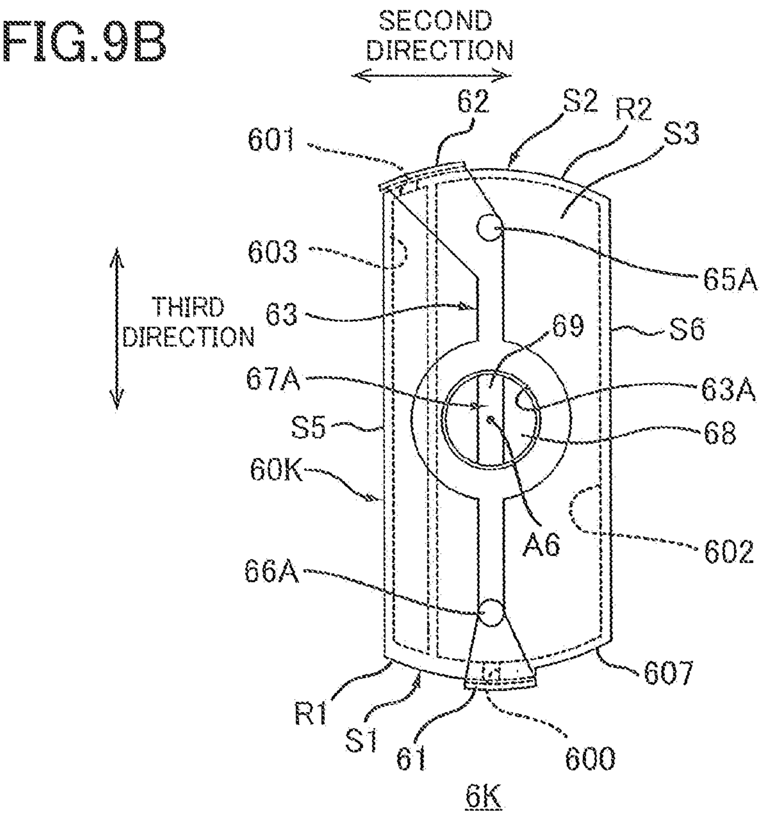
FIG. 9B is a side view of the toner cartridge illustrated in FIG. 8, illustrating a state where the first shutter is positioned at a first closed position and the second shutter is positioned at a second closed position.

As illustrated in FIG. 9A and FIG. 9B, the first shutter 61 is positioned on the first surface 51. The first shutter 61 is movable with respect to the cartridge housing 60K between a first closed position (see FIG. 9B) and a first open position (see FIG. 9A). The first shutter 61 closes the first opening 600 in a state in which the first shutter 61 is positioned at the first closed position (see FIG. 9B). The first opening 600 opens in a state in which the first shutter 61 is positioned at the first open position (see FIG. 9A).

The first shutter 61 is movable with respect to the cartridge housing 60K between the first closed position and the first open position along the first circumferential surface R1. Therefore, the first shutter 61 is movable smoothly even when the cartridge housing 60K is the hexahedron.

The first shutter 61 is spaced apart from the first opening 600 in a circumferential direction of the first circumferential surface R1 in the state in which the first shutter 61 is positioned at the first open position (see FIG. 9A). The first shutter 61 is positioned on an opposite side of the second recess 607 with respect to the first opening 600 in the circumferential direction of the first circumferential surface R1 in the state in which the first shutter 61 is positioned at the first open position (see FIG. 9A).

The first shutter 61 has an arc shape extending along the first circumferential surface R1. The first shutter 61 extends in the first direction. The first shutter 61 has one end portion and the other end portion in the first direction.

3.5 Second Shutter 62

The second shutter 62 is positioned on the second surface S2. The second shutter 62 is movable with respect to the cartridge housing 60K between a second closed position (see FIG. 9B) and a second open position (see FIG. 9A). The second shutter 62 closes the second opening 601 in a state in which the second shutter 62 is positioned at the second closed position (see FIG. 9B). The second opening 601 opens in a state in which the second shutter 62 is positioned at the second open position (see FIG. 9A).

The second shutter 62 is movable with respect to the cartridge housing 60K between the second closed position and the second open position along the second circumferential surface R2. Therefore, the second shutter 62 is movable smoothly even when the cartridge housing 60K is the hexahedron.

The second shutter 62 is spaced apart from the second opening 601 in the circumferential direction of the second circumferential surface R2 in the state in which the second shutter 62 is positioned at the second open position (see FIG. 9A).

The second shutter 62 has an arc shape extending along the second circumferential surface R2. The second shutter 62 extends in the first direction. The second shutter 62 has one end portion and the other end portion in the first direction.

3.6 First Arm 63

The first arm 63 connects the first shutter 61 and the second shutter 62. The first arm 63 connects one end portion of the first shutter 61 in the first direction to one end portion of the second shutter 62 in the first direction.

The first arm 63 is positioned on the first flat surface S3. The first arm 63 has a hole 63A. The hole 63A has a circular shape. The arm support portion 68 of the engaging portion 67A is fitted into the hole 63A. According to the structure, the arm support portion 68 of the engaging portion 67A supports the first arm 63 such that the first arm 63 is rotatable. The first arm 63 is movable along the first flat surface S3. The first arm 63 is rotatable about the central axis A6 of the arm support portion 68. Accordingly, the first shutter 61 and the second shutter 62 are rotatable about the central axis A6 of the arm support portion 68 as a rotation axis. In other words, the first shutter 61 is rotatable about the rotation axis A6 between the first closed position and the first open position. The second shutter 62 is rotatable about the rotation axis A6 between the second closed position and the second open position. According to the structure, the first shutter 61 and the second shutter 62 are allowed to rotate together as one body.

3.7 Second Arm 64

As illustrated in FIG. 7, the second arm 64 connects the first shutter 61 and the second shutter 62. The second arm 64 connects the other end portion of the first shutter 61 in the first direction and the other end portion of the second shutter 62 in the first direction.

The second arm 64 is positioned on the second flat surface S4. The second arm 64 has a hole 64A. The hole 64A has a circular shape. The arm support portion 68 of the engaging portion 67B is fitted into the hole 64A. According to the structure, the arm support portion 68 of the engaging portion 67B supports the second arm 64 such that the second arm 64 is rotatable. The second arm 64 is movable along the second flat surface S4. The second arm 64 is explained in the same manner as the first arm 63. Therefore, the explanation of the second arm 64 is omitted.

3.8 First Protrusions 65A, 65B

As illustrated in FIG. 9A, the first protrusion 65A is provided in the first arm 63. In other words, the first arm 63 has the first protrusion 65A. The first protrusion 65A is positioned on an opposite side of the first flat surface S3 with respect to the first arm 63 in the first direction. The first protrusion 65A is positioned between the second shutter 62 and the hole 63A in the third direction. The first protrusion 65A extends from the first arm 63 in the first direction. The first protrusion 65A has a cylindrical shape.

Figure 10B:
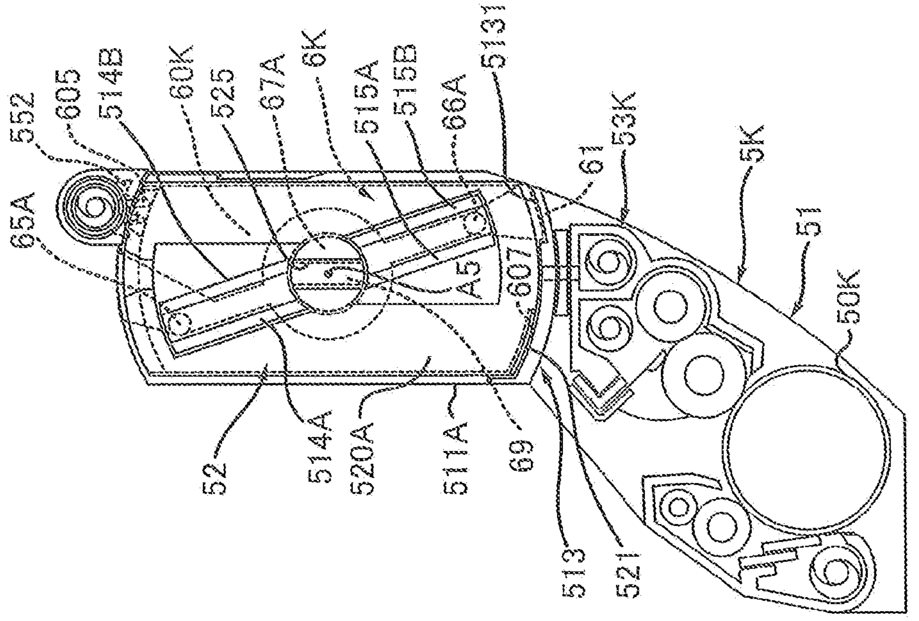
FIG. 10B is an explanatory view for explaining a state where the toner cartridge illustrated in FIG. 7 is mounted on the process unit and the cartridge housing is positioned at a second position.
Figure 10A:
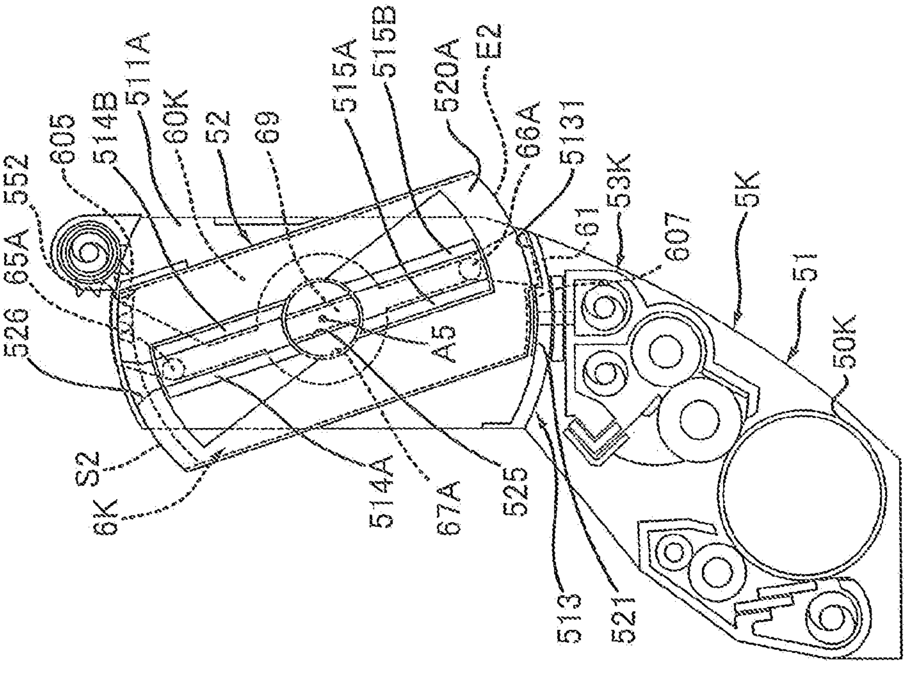
FIG. 10A is an explanatory view for explaining a state where the toner cartridge illustrated in FIG. 7 is mounted on the process unit and the cartridge housing is positioned at a first position.

The first protrusion 65A is engaged with the first frame 51 of the process unit 5K in the state in which the toner cartridge 6K is mounted on the process unit 5K (see FIG. 10A). The first protrusion 65A is fitted between the first rib 514A and the first rib 514B in the state in which the toner cartridge 6K is mounted on the process unit 5K.

As illustrated in FIG. 7, the first protrusion 65B is provided in the second arm 64. The first protrusion 65B is positioned on an opposite side of the second flat surface S4 with respect to the second arm 64 in the first direction. The first protrusion 65B is positioned between the second shutter 62 and the hole 64A in the third direction. The first protrusion 65B is explained in the same manner as the first protrusion 65A. Therefore, the explanation for the first protrusion 65B is omitted.

3.9 Second Protrusions 66A, 66B

As illustrated in FIG. 9A, the second protrusion 66A is provided in the first arm 63. In other words, the first arm 63 has the second protrusion 66A. The second protrusion 66A is positioned on an opposite side of the first flat surface S3 with respect to the first arm 63 in the first direction. The second protrusion 66A is positioned between the first shutter 61 and the hole 63A in the third direction. The second protrusion 66A extends from the first arm 63 in the first direction. The second protrusion 66A has a cylindrical shape.

The second protrusion 66A is engaged with the first frame 51 of the process unit 5K in the state in which the toner cartridge 6K is mounted on the process unit 5K (see FIG. 10A). The second protrusion 66A is fitted between the second rib 515A and the second rib 515B in the state in which the toner cartridge 6K is mounted on the process unit 5K (see FIG. 10A).

As illustrated in FIG. 7, the second protrusion 66B is provided in the second arm 64. The second protrusion 66B is positioned on an opposite side of the second flat surface S4 with respect to the second arm 64 in the first direction. The second protrusion 66B is positioned between the first shutter 61 and the hole 64A in the third direction. The second protrusion 66B is explained in the same manner as the second protrusion 66A. Therefore, the explanation for the second protrusion 66B is omitted.

3.10 Mounting State of Toner Cartridge 6K to Process Unit 5K

As illustrated in FIG. 10A and FIG. 10B, the toner cartridge 6K is positioned above the developing device 53K in the state in which the toner cartridge 6K is mounted on the process unit 5K. The toner cartridge 6K is supported by the second frame 52 in the state in which the toner cartridge 6K is mounted on the process unit 5K.

The cartridge housing 60K is positioned between the side plate 520A and the side plate 520B in the first direction in the state in which the toner cartridge 6K is mounted on the process unit 5K. The second side plate 511A of the first frame 51 and the side plate 520A of the second frame 52 are aligned in the first direction with the cartridge housing 60K in the state in which the toner cartridge 6K is mounted on the process unit 5K.

The first shutter 61 is fitted into the first recess 5131 in the state in which the toner cartridge 6K is mounted on the process unit 5K. The frame shutter 521 is fitted into the second recess 607 in the state in which the toner cartridge 6K is mounted on the process unit 5K. The guided portion 69 is fitted into the first guide 525 in the state in which the toner cartridge 6K is mounted on the process unit 5K.

As illustrated in FIG. 11A and FIG. 11B, the cartridge housing 60K includes one end portion E1 and the other end portion E2 in the state in which the toner cartridge 6K is mounted on the process unit 5K. The other end portion E2 is spaced apart from the one end portion E1 in the third direction. The one end portion E1 includes the second surface S2 having the second opening 601. The other end portion E2 includes the first surface S1 having the first opening 600. The one end portion E1 of the cartridge housing 60K is positioned on an opposite side of the photoconductive drum 50K with respect to the other end portion E2 of the cartridge housing 60K in the state in which the toner cartridge 6K is mounted on the process unit 5K. The third direction is a vertical direction in the state in which the toner cartridge 6K is mounted on the process unit 5K. The one end portion E1 of the cartridge housing 60K is positioned on an upper end of the cartridge housing 60K in the state in which the toner cartridge 6K is mounted on the process unit 5K. The other end portion E2 of the cartridge housing 60K is positioned on a lower end of the cartridge housing 60K in the state in which the toner cartridge 6K is mounted on the process unit 5K.

The cartridge housing 60K is rotatable with respect to the second support portion 511 of the first frame 51 between the first position (see FIG. 11A) and the second position (see FIG. 11B) in the state in which the toner cartridge 6K is mounted on the process unit 5K. The second frame 52 allows the toner cartridge 6K to move between the first position and the second position in the state in which the toner cartridge 6K is mounted. Therefore, the cartridge housing 60K is rotatable with the second frame 52 about the axis A5 of the second frame 52 as a rotation center between the first position and the second position in the state in which the toner cartridge 6K is mounted on the process unit 5K. The central axis A6 as a rotation center of the first shutter 61 and the second shutter 62 is identical with the axis A5 of the second frame 52 in a state in which the toner cartridge 6K is mounted on the second frame 52.

The rotation center A5 of the cartridge housing 60K is positioned at the center of the dimension L1 (see FIG. 7) of the cartridge housing 60K in the third direction in the state in which the toner cartridge 6K is mounted on the second frame 52 of the process unit 5K.

The guided portion 69 is fitted into the first guide 525 in the state in which the toner cartridge 6K is mounted on the second frame 52 (see FIG. 10A). Therefore, the cartridge housing 60K is rotatable between the first position and the second position with respect to the second support portion 511 together with the first guide 525 in a state in which the toner cartridge 6K is mounted on the process unit 5K and the guided portion 69 is in contact with the first guide 525.

The first protrusion 65A is fitted between the first rib 514A and the first rib 514B in the state in which the toner cartridge 6K is mounted on the second frame 52 (see FIG. 10A). The second protrusion 66A is fitted between the second rib 515A and the second rib 515B in the state in which the toner cartridge 6K is mounted on the second frame 52 (see FIG. 10A).

According to the above, the first shutter 61 and the second shutter 62 can stop movement in a rotation direction of the cartridge housing 60K in the state in which the toner cartridge 6K is mounted on the second frame 52. As a result, when the cartridge housing 60K rotates with respect to the second support portion 511, the cartridge housing 60K rotates with respect to the first shutter 61 and the second shutter 62.

As illustrated in FIG. 11A, it is difficult that the toner cartridge 6K supplies the toner to the developing device 53K in the state in which the cartridge housing 60K is positioned at the first position. The second frame 52 is positioned at the frame first position in the state in which the cartridge housing 60K is positioned at the first position. The first shutter 61 is positioned at the first closed position in the state in which the cartridge housing 60K is positioned at the first position.

It is difficult that the toner cartridge 6K collects the waste toner from the conveying tube 550 in the state in which the cartridge housing 60K is positioned at the first position. The second shutter 62 is positioned at the second closed position in the state in which the cartridge housing 60K is positioned at the first position. The third shutter 551 is positioned at the third closed position in the state in which the cartridge housing 60K is positioned at the first position.

In the state in which the cartridge housing 60K is positioned at the first position, at least a part of the one end portion E1 of the cartridge housing 60K protrudes from the second support portion 511 of the first frame 51 in the second direction, and at least a part of the other end portion E2 of the cartridge housing 60K protrudes to an opposite side of the one end portion E1 from the second support portion 511 of the first frame 51.

In the state in which the cartridge housing 60K is positioned at the first position, the one end portion E1 of the cartridge housing 60K is positioned on one side in the second direction of the one end portion E1 of the cartridge housing 60K positioned at the second position (see FIG. 11B), and the other end portion E2 of the cartridge housing 60K is positioned on the other side in the second direction of the other end portion E2 of the cartridge housing 60K positioned in the second position (see FIG. 11B).

In the state in which the cartridge housing 60K is positioned at the first position, the toner cartridge 6K is removable from the second frame 52 of the process unit 5K along the fourth direction. In the state in which the cartridge housing 60K is positioned at the first position, the toner cartridge 6K does not overlap with the second portion 5502 of the conveying tube 550 in a removing direction in which the toner cartridge 6K is removed from the process unit 5K. The second opening 601 is spaced apart from the second portion 5502 of the conveying tube 550 in the second direction in the state in which the toner cartridge 6K is mounted on the process unit 5K and the cartridge housing 60K is positioned at the first position.

The one end portion E1 of the cartridge housing 60K is positioned on an opposite side of the first end 3E1 of the top cover 3 (see FIG. 2) with respect to the second portion 5502 in the second direction in the state in which the cartridge housing 60K is positioned at the first position.

According to the above, the user can easily access the one end portion E1 of the cartridge housing 60K from the opposite side of the first end 3E1 of the top cover 3 in a state in which the top cover 3 is positioned at the open position and the cartridge housing 60K is positioned at the first position. As a result, the toner cartridge 6K is removable smoothly from the process unit 5K.

The exposing head 7K is extracted from the space between the toner cartridge 6K and the toner cartridge 6C in the second direction as illustrated by virtual lines in the state in which the top cover 3 is positioned at the open position. The exposing head 7K is positioned at a space SP between the cartridge housing 60K positioned at the second position and the toner cartridge 6C in the state in which the top cover 3 is positioned at the closed position as illustrated by virtual lines in FIG. 11B.

As illustrated in FIG. 11A, at least a part of the one end portion E1 of the cartridge housing 60K is positioned at the space SP in a state in which the top cover 3 is positioned at the open position, the exposing head 7K is extracted from the space SP, and the cartridge housing 60K is positioned at the first position.

Accordingly, the space SP for disposing the exposing head 7K can be used as a space for disposing the one end portion E1 of the cartridge housing 60K. Therefore, the size reduction of the image forming apparatus 1 in the second direction can be positively realized.

As illustrated in FIG. 11B, the toner cartridge 6K can supply toner to the developing device 53K in the state in which the toner cartridge 60K is positioned at the second position. The second frame 52 is positioned at the frame second position in the state in which the toner cartridge 6K is positioned at the second position. The first shutter 61 is positioned at the first open position in the state in which the cartridge housing 60K is positioned at the second position. The first opening 600 communicates with the toner receiving port 5130 in the vertical direction in the state in which the cartridge housing 60K is positioned at the second position.

The toner cartridge 6K can collect waste toner from the conveying tube 550 in the state in which the cartridge housing 60K is positioned at the second position. The second shutter 62 is positioned at the second open position in the state in which the cartridge housing 60K is positioned at the second position.

As illustrated in FIG. 10A and FIG. 10B, when the cartridge housing 60K moves from the first position to the second position in a state in which the second gear 605 is engaged with the first gear 552, the third shutter 551 moves from the third closed position to the third open position. Therefore, the third shutter 551 is positioned at the third open position in the state in which the toner cartridge 6K is positioned at the second position as illustrated in FIG. 11B. Accordingly, opening/closing of the third shutter 551 may be interlocked with rotation of the cartridge housing 60K in the state in which the toner cartridge 6K is mounted on the process unit 5K.

The shutter opening 557, the third opening 553, and the second opening 601 communicate with one another in the vertical direction in the state in which the cartridge housing 60K is positioned at the second position.

It is difficult to remove the toner cartridge 6K from the second frame 52 of the process unit 5K in the state in which the cartridge housing 60K is positioned at the second position. The second portion 5502 of the conveying tube 550 is disposed on an opposite side of the developing device 53K with respect to the toner cartridge 6K in the third direction in the state in which the toner cartridge 6K is mounted on the process unit 5K.

The toner cartridge 6K overlaps with the second portion 5502 of the conveying tube 550 in the third direction in the state in which the toner cartridge 6K is mounted on the process unit 5K and the cartridge housing 60K is positioned at the second position. The second portion 5502 of the conveying tube 550 is positioned above the cartridge housing 60K in the state in which the toner cartridge 6K is mounted on the process unit 5K and the cartridge housing 60K is positioned at the second position.

The second opening 601 is aligned with the second portion 5502 of the conveying tube 550 in the third direction in the state in which the toner cartridge 6K is mounted on the process unit 5K and the cartridge housing 60K is positioned at the second position.

Therefore, the shutter opening 557, the third opening 553, and the second opening 601 communicate with one another in the vertical direction in the state in which the cartridge housing 60K is positioned at the second position. Accordingly, the second opening 601 can receive waste toner conveyed by the conveying tube 550 smoothly through the shutter opening 557 and the third opening 553 by gravity.

3.11 Movement of Cartridge Housing 60K from Second Position to First Position As illustrated in FIG. 11A and FIG. 11B, when the cartridge housing 60K moves from the second position to the first position, the one end portion E1 of the cartridge housing 60K comes close to the toner cartridge 6C and the other end portion E2 of the cartridge housing 60K goes away from the toner cartridge 6C.

Accordingly, the space for rotating the cartridge housing 60K in the state in which the toner cartridge 6K is mounted on the process unit 5K can be secured on both sides of the cartridge housing 60K in the second direction.

As a result, a gap between the toner cartridge 6K and the toner cartridge 6C in the second direction can be reduced. Accordingly, the size reduction of the image forming apparatus 1 in the second direction can be realized.

When the cartridge housing 60K moves from the second position to the first position, the one end portion E1 of the cartridge housing 60K moves so as to go away from the first end 3E1 (see FIG. 2) in the second direction. Accordingly, the user can easily access the one end portion of the cartridge housing 60K from the opposite side of the first end 3E1 of the top cover 3 in the state in which the top cover 3 is positioned at the open position and the cartridge housing 60K is positioned at the first position. As a result, the toner cartridge 6K is removable from the process unit 5K smoothly.

4. Operation and Effect (1) According to the image forming apparatus 1, the cartridge housing 60K is rotatable between the first position and the second position in the state in which the toner cartridge 6K is mounted on the process unit 5K as illustrated in FIG. 11A and FIG. 11B. The first shutter 61 is positioned at the first closed position in the state in which the cartridge housing 60K is positioned at the first position. The first shutter 61 is positioned at the first open position in the state in which the cartridge housing 60K is positioned at the second position.

Accordingly, the first shutter 61 is movable between the first closed position and the first open position by rotating the cartridge housing 60K between the first position and the second position in the state in which the toner cartridge 6K is mounted on the process unit 5K.

Then, when the toner cartridge 60K moves from the second position to the first position, the one end portion E1 of the cartridge housing 60K comes close to the toner cartridge 6C and the other end portion E2 of the cartridge housing 60K goes away from the toner cartridge 6C.

Therefore, the space for rotating the cartridge housing 60K can be secured on both sides of the cartridge housing 60K in the second direction. As a result, the gap between the toner cartridge 6K and the toner cartridge 6C in the second direction can be reduced. According to the above, the size reduction of the image forming apparatus 1 in the second direction can be realized.

5. Second Embodiment

Next, a second embodiment will be explained with reference to FIG. 12 and FIG. 13. In the second embodiment, the same signs are given to the same components as those of the first embodiment and explanation therefor is omitted.

Figure 12:
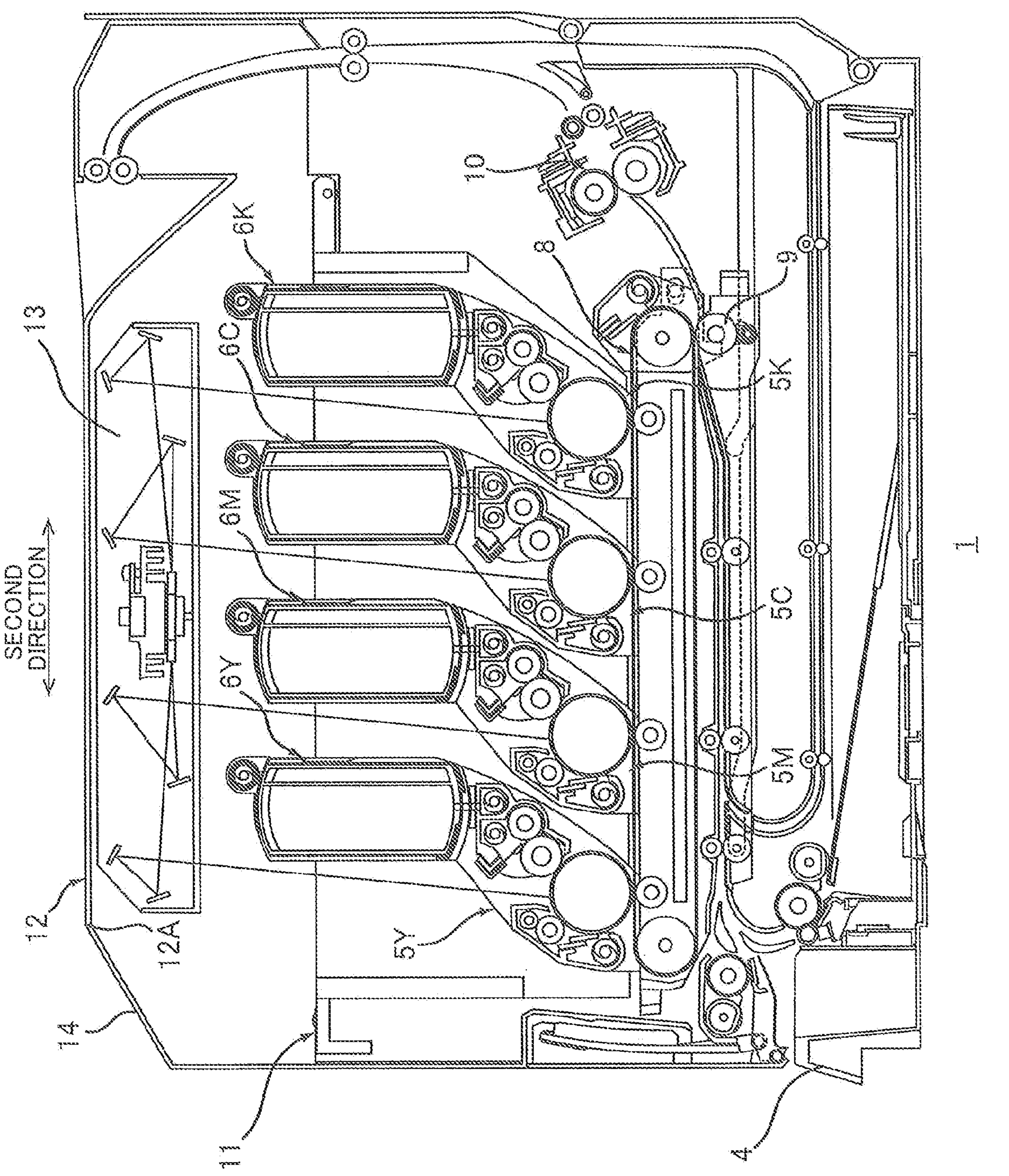
FIG. 12 is a schematic structural view of an image forming apparatus according to a second embodiment.
Figure 13:
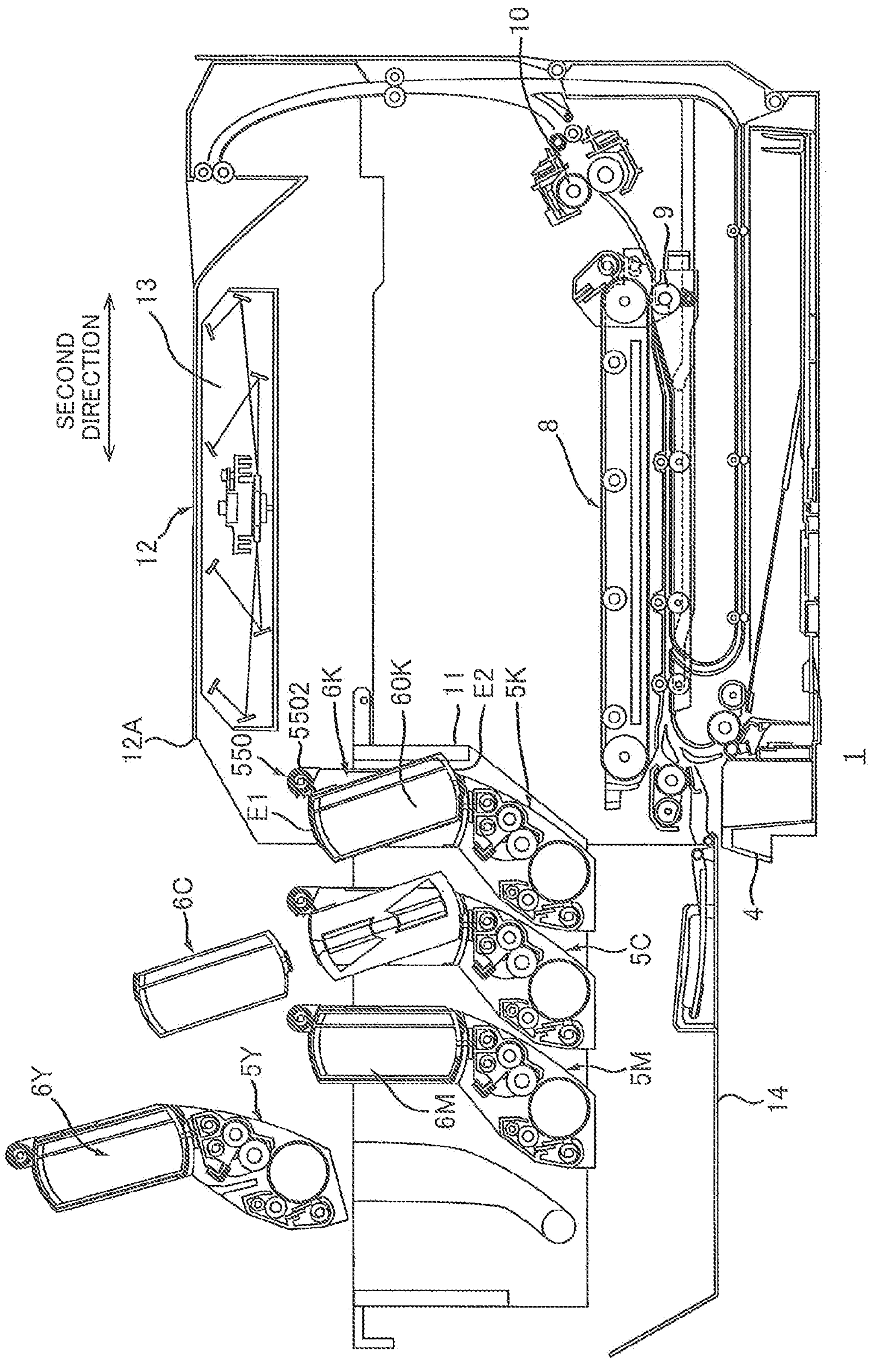
FIG. 13 is an explanatory view for explaining movement of a drawer illustrated in FIG. 12, illustrating a state where the drawer is positioned at an outer position.

As illustrated in FIG. 12 and FIG. 13, the image forming apparatus 1 includes a body housing 12, a cover 14, a drawer 11, and an exposing device 13.

The body housing 12 accommodates the sheet cassette 4, the drawer 11, the four process units 5K, 5C, 5M, and 5Y, the four toner cartridges 6K, 6C, 6M, and 6Y, the exposing device 13, the belt unit 8, the transfer roller 9, and the fixing device 10.

The body housing 12 includes a body opening 12A. The body opening 12A is positioned at one end portion of the body housing 12 in the second direction.

The cover 14 is movable between a closed position (see FIG. 12) and an open position (see FIG. 13). When the cover 14 is positioned at the closed position, the cover 14 closes the body opening 12A. When the cover 14 is positioned at the open position, the cover 14 opens the body opening 12A.

The drawer 11 is movable between an inner position (see FIG. 12) and an outer position (see FIG. 13) in the second direction through the body opening 12A in the state in which the cover 14 is positioned at the open position. As illustrated in FIG. 12, the entire drawer 11 is positioned inside the body housing 12 in a state in which the drawer 11 is positioned at the inner position. As illustrated in FIG. 13, at least a part of the drawer 11 is positioned outside the body housing 12 in a state in which the drawer 11 is positioned at the outer position.

In the state in which the drawer 11 is positioned at the outer position, the four process units 5K, 5C, 5M, and 5Y are mountable.

As illustrated in FIG. 12, the exposing device 13 can expose circumferential surfaces of the four photoconductive drums 50K, 50C, 50M, and 50Y in the state in which the four process units 5K, 5C, 5M, and 5Y are mounted on the drawer 11 and the drawer 11 is positioned at the inner position. The exposing device 13 is a laser scan unit.

As illustrated in FIG. 13, the toner cartridge 6K is mountable on the process unit 5K in the state in which the drawer 11 is positioned at the outer position.

The cartridge housing 60K of the toner cartridge 6K is rotatable between the first position (see FIG. 11A) and the second position (see FIG. 11B) in the state in which the drawer 11 is positioned at the outer position and the toner cartridge 6K is mounted on the process unit 5K.

When the cartridge housing 60K moves from the second position to the first position, the one end portion E1 of the cartridge housing 60K moves in a direction in which the drawer 11 moves from the inner position to the outer position.

The one end portion E1 of the cartridge housing 60K is positioned at an upper end of the cartridge housing 60K in the state in which the toner cartridge 6K is mounted on the process unit 5K and the toner cartridge 6K is positioned at the second position. The one end portion E1 of the cartridge housing 60K is spaced apart from the second portion 5502 of the conveying tube 550 in the direction in which the drawer 11 moves from the inner position to the outer position in the state in which the toner cartridge 6K is mounted on the process unit 5K and the toner cartridge 6K is positioned at the first position.

According to the above, the user can easily access the one end portion E1 of the cartridge housing 60K from the opposite side of the body housing 12 in the state in which the drawer 11 is positioned at the outer position and the cartridge housing 60K is positioned at the first position. As a result, the toner cartridge 6K is removable from the process unit 5K smoothly.

What is claimed is:

1. An image forming apparatus, comprising:
- a first frame;
- a first photoconductive drum rotatable about a first axis extending in a first direction and supported by the first frame;
- a second frame;
- a second photoconductive drum rotatable about a second axis extending in the first direction and supported by the second frame, the second frame being aligned with the first frame in a second direction intersecting the first direction;
- a first toner cartridge detachable from the first frame and having a cartridge housing accommodating toner, the cartridge housing including one end portion and the other end portion spaced apart from the one end portion in a third direction intersecting the first direction and the second direction in a state in which the first toner cartridge is attached to the first frame, the first toner cartridge being movable between a detachable position where the first toner cartridge is detachable from the first frame and an undetachable position where the first toner cartridge is undetachable from the first frame; and a second toner cartridge detachable from the second frame, wherein, when the cartridge housing moves from the undetachable position to the detachable position, the one end portion of the cartridge housing comes close to the second toner cartridge and the other end portion of the cartridge housing goes away from the second toner cartridge and wherein a dimension of the cartridge housing in the third direction is greater than a dimension of the cartridge housing in the second direction in the state in which the first toner cartridge is attached to the first frame.

2. The image forming apparatus according to claim 1, wherein the cartridge housing rotates from the undetachable position to the detachable position.

3. The image forming apparatus according to claim 1, wherein the first frame includes (i) an outer frame aligned with the cartridge housing in the first direction in the state in which the first toner cartridge is attached to the first frame, and (ii) an inner frame movable with respect to the outer frame and configured to move the cartridge housing between the detachable position and the undetachable position in the state in which the first toner cartridge is attached to the first frame, and wherein, when the cartridge housing is positioned at the detachable position, the one end portion of the cartridge housing protrudes in the second direction from the outer frame, and the other end portion of the cartridge housing protrudes in an opposite direction of the direction in which the one end portion protrudes with respect to the outer frame.

4. The image forming apparatus according to claim 1, wherein, in the state in which the cartridge housing is positioned at the detachable position, the one end portion of the cartridge housing is positioned on one side in the second direction of a position of the one end portion of the cartridge housing when the cartridge housing is positioned at the undetachable position, and the other end portion of the cartridge housing is positioned on the other side in the second direction of a position of the other end portion of the cartridge housing when the cartridge housing is positioned at the undetachable position.

5. The image forming apparatus according to claim 1, further comprising:

a body housing including a body opening; and a top cover having a first end connected to the body housing and a second end, the top cover being movable between an open position at which the body opening is opened and a closed position at which the body opening is closed, wherein the one end portion of the cartridge housing is positioned on an opposite side of the first photoconductive drum with respect to the other end portion of the cartridge housing in the state in which the first toner cartridge is attached to the first frame, and wherein the one end portion of the cartridge housing moves such that the one end portion of the cartridge housing goes away from the first end of the cover in the second direction when the cartridge housing moves from the undetachable position to the detachable position.

6. The image forming apparatus according to claim 5, further comprising an exposing head configured to expose the first photoconductive drum, the exposing head being positioned, when the top cover is positioned at the closed position, in a space between the cartridge housing positioned at the undetachable position and the second toner cartridge, wherein, when the cartridge housing is positioned at the detachable position, at least a part of the one end portion of the cartridge housing is positioned in the space in a state in which the exposing head is moved from the space after the top cover moves from the closed position to the open position.

7. The image forming apparatus according to claim 1, further comprising:

a body housing; and a drawer movable between an inner position which is positioned in the body housing and an outer position which is positioned outside the body housing in the second direction and to which the first frame and the second frame are attachable, wherein the one end portion of the cartridge housing moves in a direction in which the drawer moves from the inner position to the outer position when the cartridge housing moves from the undetachable position to the detachable position.

8. The image forming apparatus according to claim 1, wherein the first frame includes (i) an outer frame aligned with the cartridge housing in the first direction in the state in which the first toner cartridge is attached to the first frame, and (ii) an inner frame movable with respect to the outer frame and configured to move the first toner cartridge between the detachable position and the undetachable position in the state in which the first toner cartridge is attached to the first frame, and wherein the outer frame includes a stopper configured to stop the cartridge housing at the undetachable position when the cartridge housing moves from the detachable position to the undetachable position.

9. The image forming apparatus according to claim 1, wherein a rotation center of the cartridge housing is positioned at a center in a dimension of the cartridge housing in the third direction in the state in which the first toner cartridge is attached to the first frame.

10. An image forming apparatus, comprising:

a first frame;

a first photoconductive drum rotatable about a first axis and supported by the first frame;

a second frame;

a second photoconductive drum rotatable about a second axis and supported by the second frame, the second frame being aligned with the first frame;

a first toner cartridge detachable from the first frame and having a cartridge housing accommodating toner, the cartridge housing including one end portion and the other end portion spaced apart from the one end portion, the first toner cartridge being movable between a detachable position where the first toner cartridge is detachable from the first frame and an undetachable position where the first toner cartridge is undetachable from the first frame; and a second toner cartridge detachable from the second frame, wherein, when the cartridge housing moves from the undetachable position to the detachable position, the one end portion of the cartridge housing comes close to the second toner cartridge and the other end portion of the cartridge housing goes away from the second toner cartridge wherein the first frame includes (i) an outer frame aligned with the cartridge housing in the state in which the first toner cartridge is attached to the first frame and (ii) an inner frame movable with respect to the outer frame and configured to move the cartridge housing between the detachable position and the undetachable position in the state in which the first toner cartridge is attached to the first frame, and wherein the cartridge housing is positioned at the detachable position, the one end portion of the cartridge housing protrudes from the outer frame, and the other end potion of the cartridge housing protrudes with respect to the outer frame in an opposite direction in which the one end portion protrudes.

11. The image forming apparatus according to claim 10, wherein a dimension of the cartridge housing in a direction is greater than a dimension of the cartridge housing in a perpendicular direction perpendicular to the direction in the state in which the first toner cartridge is attached to the first frame.

12. The image forming apparatus according to claim 10, wherein the cartridge housing rotates from the undetachable position to the detachable position.

13. The image forming apparatus according to claim 10, wherein, in the state in which the cartridge housing is positioned at the detachable position, the one end portion of the cartridge housing is positioned on one side of a position of the one end portion of the cartridge housing when the cartridge housing is positioned at the undetachable position, and the other end portion of the cartridge housing is positioned on the other side of a position of the other end portion of the cartridge housing when the cartridge housing is positioned at the undetachable position.

14. The image forming apparatus according to claim 10, further comprising:

a body housing; and a drawer movable between an inner position which is positioned in the body housing and an outer position which is positioned outside the body housing and to which the first frame and the second frame are attachable, wherein the one end portion of the cartridge housing moves in a direction in which the drawer moves from the inner position to the outer position when the cartridge housing moves from the undetachable position to the detachable position.

15. The image forming apparatus according to claim 10, wherein the outer frame includes a stopper configured to stop the cartridge housing at the undetachable position when the cartridge housing moves from the detachable position to the undetachable position.

16. The image forming apparatus according to claim 10, wherein a rotation center of the cartridge housing is positioned at a center in a dimension of the cartridge housing in the state in which the first toner cartridge is attached to the first frame.

17. An image forming apparatus, comprising:

a first frame:

a first photoconductive drum rotatable about a first axis and supported by the first frame;

a second frame;

a second photoconductive drum rotatable about a second axis and supported by the second frame, the second frame being aligned with the first frame;

a first toner cartridge detachable from the first frame and having a cartridge housing accommodating the toner, the cartridge housing including one end portion and the other end portion spaced apart from the one end portion, the first toner cartridge is detachable from the first frame and an undetachable position where the first toner cartridge is undetachable from the first frame; and a second toner cartridge detachable from the second frame, wherein, when the cartridge housing moves from the undetachable position to the detachable position, the one end portion of the cartridge housing comes close to the second toner cartridge and the other end portion of the cartridge housing goes away from the second toner cartridge, wherein the image forming apparatus further comprises:

a body housing including a body opening; and a top cover having a first end connected to the body housing and a second end, the top cover being movable between an open position at which the body opening is opened and a closed position at which the body opening is closed, wherein the one end portion of the cartridge housing is positioned on an opposite side of the first photoconductive drum with respect to the other end portion of the cartridge housing in the state in which the first toner cartridge is attached to the first frame, and wherein the one end position of the cartridge housing moves such that the one end portion of the cartridge housing moves from the undetachable position to the detachable position.

18. The image forming apparatus according to claim 17, further comprising an exposing head configured to expose the first photoconductive drum, the exposing head being positioned, when the top cover is positioned at the closed position, in a space between the cartridge housing positioned at the undetachable position and the second toner cartridge, wherein, when the cartridge housing is positioned at the detachable position, at least a part of the one end portion of the cartridge housing is positioned in the space in a state in which the exposing head is moved from the space after the top cover moves from the closed position to the open position.

* * * * *